United States Patent
Wang et al.

(10) Patent No.: US 11,741,073 B2
(45) Date of Patent: Aug. 29, 2023

(54) GRANULARLY TIMESTAMPED CONCURRENCY CONTROL FOR KEY-VALUE STORE

(71) Applicant: Alibaba Singapore Holding Private Limited, Singapore (SG)

(72) Inventors: Rui Wang, Redmond, WA (US); Zhu Pang, Bellevue, WA (US); Qingda Lu, Bellevue, WA (US); Shuo Chen, Bellevue, WA (US); Jiesheng Wu, Redmond, WA (US)

(73) Assignee: Alibaba Singapore Holding Private Limited, Singapore (SG)

( * ) Notice: Subject to any disclaimer, the term of this patent is extended or adjusted under 35 U.S.C. 154(b) by 0 days.

(21) Appl. No.: 17/336,141

(22) Filed: Jun. 1, 2021

(65) Prior Publication Data
US 2022/0382734 A1 Dec. 1, 2022

(51) Int. Cl.
*G06F 16/23* (2019.01)
*G06F 16/248* (2019.01)
*G06F 16/27* (2019.01)

(52) U.S. Cl.
CPC ...... *G06F 16/2322* (2019.01); *G06F 16/2379* (2019.01); *G06F 16/248* (2019.01); *G06F 16/278* (2019.01)

(58) Field of Classification Search
CPC ............. G06F 16/2322; G06F 16/2379; G06F 16/248; G06F 16/278
See application file for complete search history.

(56) References Cited

U.S. PATENT DOCUMENTS 7,424,499 B2 9/2008 Lomet
8,620,884 B2 12/2013 Calder et al.
(Continued)

OTHER PUBLICATIONS

Office Action for U.S. Appl. No. 17/335,728, dated Oct. 5, 2022, Lu, "Fast Recovery and Replication of Key-Value Stores", 12 pages.
(Continued)

*Primary Examiner* — Huawen A Peng
(74) *Attorney, Agent, or Firm* — Lee & Hayes, P.C.

(57) ABSTRACT

Systems and methods discussed herein, based on a key-value data store including multiple-tiered sorted data structures in memory and storage, implement granularly timestamped concurrency control. The multiple-tiering of the key-value data store enables resolving the snapshot queries by returning data record(s) according to granularly timestamped snapshot lookup instead of singularly indexed snapshot lookup. Queries return a merged collection of records including updates from data structures in memory and in storage, such that a persistent storage transaction may refer to non-committed updates up to a timeframe defined by the snapshot read timestamp. This way, inconsistency is avoided that would result from merely reading data records committed in storage, without regard as to pending, non-committed updates thereto. The global timestamp further modifies the generation of the local transaction commit timestamp and the local snapshot read timestamp, so as to establish a granularly timestamped concurrency control scheme (over three levels of granularity).

12 Claims, 12 Drawing Sheets

(56) References Cited

U.S. PATENT DOCUMENTS

| | | |
|---|---|---|
| 8,768,977 B2 | 7/2014 | Golab et al. |
| 9,176,871 B1 | 11/2015 | Serlet |
| 9,400,816 B1* | 7/2016 | Gubarev ............. G06F 16/2246 |
| 9,424,070 B2 | 8/2016 | Hutton et al. |
| 9,438,426 B2 | 9/2016 | Li et al. |
| 9,483,516 B2 | 11/2016 | Lee et al. |
| 9,684,682 B2 | 6/2017 | Mukherjee et al. |
| 9,785,510 B1 | 10/2017 | Madhavarapu et al. |
| 10,127,260 B2 | 11/2018 | Goel et al. |
| 10,146,793 B2 | 12/2018 | Srivas et al. |
| 10,289,340 B2 | 5/2019 | O'Krafka et al. |
| 10,331,797 B2 | 6/2019 | Chang et al. |
| 10,474,656 B1 | 11/2019 | Bronnikov |
| 10,482,103 B2 | 11/2019 | Lee et al. |
| 10,489,406 B2 | 11/2019 | Toillion et al. |
| 10,496,283 B2 | 12/2019 | Waghulde |
| 10,552,402 B2 | 2/2020 | Eluri et al. |
| 10,585,876 B2 | 3/2020 | Brodt et al. |
| 10,592,411 B2 | 3/2020 | Agarwal |
| 10,666,703 B2 | 5/2020 | Paduroiu et al. |
| 10,706,105 B2 | 7/2020 | Boles et al. |
| 10,706,106 B2 | 7/2020 | Boles et al. |
| 10,719,562 B2 | 7/2020 | Gupta et al. |
| 10,725,988 B2 | 7/2020 | Boles et al. |
| 10,795,871 B2 | 10/2020 | Velayudhan Pillai et al. |
| 10,956,071 B2 | 3/2021 | Subbarao |
| 10,984,018 B2 | 4/2021 | Shoolman et al. |
| 10,996,884 B2 | 5/2021 | Danilov et al. |
| 11,003,689 B2 | 5/2021 | Lee et al. |
| 11,023,457 B1* | 6/2021 | Maretic ............... G06F 16/2329 |
| 11,093,149 B2 | 8/2021 | Gole et al. |
| 11,100,071 B2 | 8/2021 | Tomlinson et al. |
| 11,188,241 B2 | 11/2021 | Schreter |
| 2006/0219772 A1* | 10/2006 | Bernstein ............ G06F 16/2308 235/379 |
| 2009/0119295 A1 | 5/2009 | Chou et al. |
| 2010/0106695 A1 | 4/2010 | Calder et al. |
| 2011/0307447 A1 | 12/2011 | Sabaa |
| 2012/0159098 A1 | 6/2012 | Cheung et al. |
| 2014/0095810 A1 | 4/2014 | Loewenstein et al. |
| 2016/0179865 A1 | 6/2016 | Bortnikov et al. |
| 2017/0011062 A1 | 1/2017 | Zaveri |
| 2017/0109394 A1* | 4/2017 | Chang ................. G06F 16/2322 |
| 2017/0177284 A1 | 6/2017 | Maesono |
| 2017/0220617 A1* | 8/2017 | Bortnikov .......... G06F 16/2329 |
| 2017/0242785 A1 | 8/2017 | O'Krafka et al. |
| 2017/0277726 A1 | 9/2017 | Huang et al. |
| 2018/0300350 A1 | 10/2018 | Mainali et al. |
| 2019/0236059 A1 | 8/2019 | Reddy et al. |
| 2019/0266100 A1 | 8/2019 | Mello et al. |
| 2019/0272254 A1 | 9/2019 | Srivas et al. |
| 2019/0278783 A1 | 9/2019 | Lipcon |
| 2019/0340277 A1 | 11/2019 | Thomsen |
| 2019/0370170 A1 | 12/2019 | Oltean et al. |
| 2020/0042533 A1 | 2/2020 | Lee et al. |
| 2020/0257669 A1 | 8/2020 | Boles et al. |
| 2020/0301900 A1 | 9/2020 | Draperi |
| 2021/0042286 A1 | 2/2021 | Kimura |
| 2021/0097036 A1* | 4/2021 | Wetterau ............... G06F 16/178 |
| 2021/0103397 A1 | 4/2021 | George |
| 2022/0318227 A1* | 10/2022 | Le ....................... G06F 16/2282 |
| 2022/0335027 A1 | 10/2022 | Seshadri |
| 2022/0382651 A1 | 12/2022 | Lu |
| 2022/0382674 A1 | 12/2022 | Wang |
| 2022/0382760 A1 | 12/2022 | Pang |
| 2023/0046216 A1 | 2/2023 | Daga et al. |

OTHER PUBLICATIONS

Office Action for U.S. Appl. No. 17/336,047, dated Dec. 15, 2022, Zhu Pang, "High-Performance Key-Value Store", 24 pages.

Kazmi, "Sort Duplicate Files According to Size and Delete Them", Mar. 2019, 5 pgs.

Office Action for U.S. Appl. No. 17/336,047, dated Jun. 2, 2023, Pang, "High-Performance Key-Value Store ", 11 pages.

Office Action for U.S. Appl. No. 17/335,853, dated Jun. 5, 2023, "Garbage Collection of Tree Structure With Page Mappings ", 18 pages.

Pang, et al., "ArkDB: A Key-Value Engine for Scalable Cloud Storage Services", Jun. 2021, 14 pgs.

* cited by examiner

800

```
KV STORE ENGINE RUNNING ON STORAGE SYSTEM RECORDS LARGEST COMMITTED
SYSTEM TIMESTAMP AND SMALLEST NON-COMMITTED TRANSACTION COMMIT TIMESTAMP
802
            ↓
KV STORE ENGINE SETS SNAPSHOT READ SYSTEM TIMESTAMP OF MAPPING UPDATE
OPERATION TO LARGEST COMMITTED TRANSACTION COMMIT TIMESTAMP
804
            ↓
KV STORE ENGINE SETS SNAPSHOT READ TIMESTAMP OF PERSISTENT STORAGE
TRANSACTION BASED ON LARGEST COMMITTED SYSTEM TIMESTAMP AND SMALLEST NON-
COMMITTED TRANSACTION COMMIT TIMESTAMP
806
            ↓
KV STORE ENGINE SETS SNAPSHOT READ TIMESTAMP OF PERSISTENT STORAGE
TRANSACTION BASED ON LARGEST COMMITTED SYSTEM TIMESTAMP AND SMALLEST NON-
COMMITTED TRANSACTION COMMIT TIMESTAMP
808
            ↓
KV STORE ENGINE RECORDS SMALLEST SNAPSHOT READ COMMIT TIMESTAMP
810
```

FIG. 8

GRANULARLY TIMESTAMPED CONCURRENCY CONTROL FOR KEY-VALUE STORE

BACKGROUND

As businesses in many industries become increasingly data-driven, there is a constant need for high-performance database designs, optimized for storage and retrieval of massive volumes of data, based on various data schemas and various hardware architectures. One example of database design is a key-value ("KV") store, based on a data schema storing records containing various data fields, keys that uniquely identify each record, and associations between keys and records. Keys may be mapped to records by various implementations, such as hash tables, dictionaries, and the like.

Additionally, in data storage systems, snapshot isolation may be implemented according to multi-version concurrency control ("MVCC"), wherein an additional generational data field (such as a column, in the case of a table-based database) is written in each data record, the generational data field recording a version number, a timestamp, or otherwise some information which orders data records by generation. Thus, a data record, under conventional MVCC techniques, includes not only data in accordance with a schema of a KV store (i.e., a KV store may be constructed to store structured or unstructured data, organized into various fields and relationships therebetween, which may be indexed and sortable in manners as contemplated by maintainers and consumers of the KV store), but furthermore is expanded to include a generational index field which places a snapshot of the data record in generational ordering among other snapshots of the same data record.

However, in large-scaled data storage systems, the addition of a generational index field to all data records of a KV store greatly compounds storage space consumed by data which does not contribute to the schema of the KV store as constructed. There is a need to implement efficient concurrency control for large-scale data storage systems without such consumption of storage space for superfluous data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 8 illustrates a flowchart of a snapshot read concurrency control method according to example embodiments of the present disclosure.

DETAILED DESCRIPTION

Systems and methods discussed herein are directed to implementing snapshot isolation, and more specifically, based on a key-value data store including multiple-tiered sorted data structures in memory and storage, implementing granularly timestamped concurrency control. Since such a key-value data store supports concurrent file and/or data operations, snapshot isolation further ensures that records of the data store are consistent between different operations, and snapshot isolation may be implemented by multi-version concurrency control ("MVCC"), wherein the data store is configured to store multiple snapshot versions of stored objects upon each write operation. In the absence of snapshot isolation, data store entries may need to be locked during writes to preserve consistency, which would degrade availability and concurrency of the data store for read and write operations.

Figure 1:
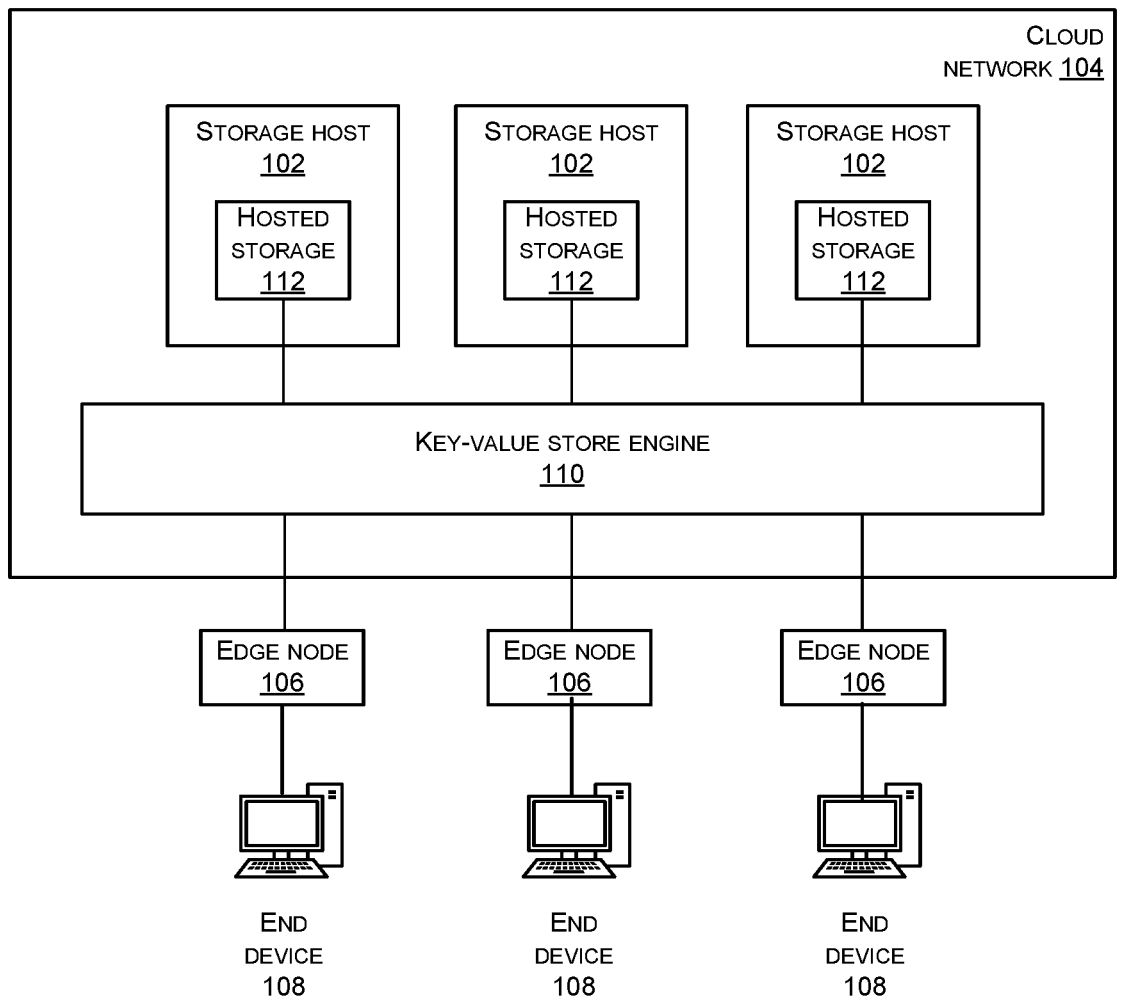
FIG. 1 illustrates an architectural diagram of a storage system according to example embodiments of the present disclosure.

FIG. 1 illustrates an architectural diagram of a storage system 100 according to example embodiments of the present disclosure. The storage system 100 may be an individual computing system or a cloud storage system, which may provide collections of servers hosting storage resources to provide distributed storage, improved availability of physical or virtual storage resources, and such benefits.

The storage system 100 may be implemented over any number of physical or virtual storage hosts (where any unspecified storage host may be referred to as a storage host 102), where multiple such storage hosts 102 may be connected by physical or virtual network connections. Though the storage system 100 may be implemented over as few as one storage host 102, by way of example, FIG. 1 illustrates that any number of storage hosts 102 may collectively be interconnected in a cloud network 104. Such a cloud network 104 may terminate at physical or virtual edge nodes (where any unspecified edge node may be referred to as an edge node 106) located at physical and/or logical edges of the cloud network 104. The edge nodes 106 may connect to any number of end devices (where any unspecified end device may be referred to as an end device 108).

A key-value ("KV") store engine 110 may be implemented on the storage system 100. The KV store engine 110 may be configured to receive and process file operations according to a file system communication protocol (such as a network file system communication protocol), a data query protocol, and the like, which implements one or more application programming interfaces ("APIs") providing file operation calls. File system communication protocols as described herein may implement APIs suitable to express a file operation having various parameters, such as Portable Operating System Interface ("POSIX"). Furthermore, in example embodiments wherein the storage system 100 is implemented over a cloud network 104, file system communication protocols as described herein may implement APIs suitable to communicate with any number of end devices 108 by a network connection to enable end devices 108 to express a file operation having various parameters, such as Filesystem in Userspace ("FUSE"), Network File System ("NFS"), Representational State Transfer ("REST") APIs, and the like.

It is known to persons skilled in the art to mitigate access load at a storage system 100 by partitioning data stored at hosted storage 112 of a storage system 100, and furthermore by replicating any partition into multiple data replicas, so that read transactions and write transactions to the same data may potentially be serviced by separate read replicas and write replicas of a same partition. Moreover, it is desired to maintain multiple read replicas of the same partition, so that read operations can be performed at arbitrarily large scales. Additionally, upon failure of a write replica, it is desired to promptly perform system recovery by promoting a read replica as a new write replica.

Partitions according to example embodiments of the present disclosure may be merged by the KV store engine implementing hard-linking amongst extents (as shall be described subsequently), so that the KV store engine may merge partitions by concatenating pages of extents at boundaries of partitions, and may split partitions by cutting pages spanning a new boundary to be created.

Data queries according to example embodiments of the present disclosure may include, for example, point lookup queries and range queries. Herein, point lookup queries refer to data queries which cause a KV store to return one record, or to return a small number of distinct records not based on a range of values in those records. Range queries refer to data queries which cause a KV store to return any number of records having values falling within a particular range. Unlike point lookup queries, range queries do not specify a number of records to be returned as a parameter.

Moreover, data queries according to example embodiments of the present disclosure may include snapshot queries. For example, both point lookup queries and range queries may be snapshot queries. Herein, snapshot queries refer to data queries which cause a KV store to return any number of records (without limitation as to number of records returned) such that, for each data query made at a query time, a state in time of the returned record(s) is consistent with the query time.

In other words, before the query time, the returned record(s) may have a prior state in a prior time, and after the query time, the returned record(s) may have a subsequent state in a subsequent time, and both the prior state in the prior time and a subsequent state in the subsequent time may be inconsistent with the query time. For example, it should be understood that between the prior time and the query time, a write operation may have changed at least one of the returned record(s), causing inconsistency between these two times, and between the query time and the subsequent time, a write operation may have changed at least one of the returned record(s), causing inconsistency between these two times. It should further be understood that such write operations may or may not necessarily have occurred between these times; regardless, consistency between the state in time of the returned record(s) and the query time prevents the returned data from being corrupted by such inconsistencies.

It should be understood that the KV store engine 110 may be configured to preserve, for each record of the KV store, multiple states in time of that record, each at distinct times. In this fashion, regardless of whether a record has been written to, the KV store engine 110 may return respective states of the record at multiple distinct times. The KV store engine 110 may implement preservation of multiple such states in time as snapshots, in accordance with snapshot isolation techniques as known to persons skilled in the art.

According to snapshot isolation techniques as known in the art, a KV store engine 110 may be configured to preserve any number of snapshots of a data record over time, at a time. Multiple snapshots of a data record may therefore be ordered by time relative to each other. Such an ordering by time relationship, for the purpose of understanding example embodiments of the present disclosure, may be subsequently referred to as generational ordering. It should further be understood that according to snapshot isolation techniques as known in the art, a KV store engine 110 may be configured to discard oldest-generation snapshots upon creating newest-generation snapshots, so that the number of generations of snapshots preserved at a time does not grow indefinitely, and so that storage space occupied by snapshots does not expand indefinitely. Techniques for preserving a finite number of generations of snapshots are known to persons skilled in the art, and need not be further elaborated herein for understanding example embodiments of the present disclosure.

According to snapshot isolation techniques as known in the art, snapshot isolation may be implemented according to multi-version concurrency control ("MVCC"), wherein an additional generational data field (such as a column, in the case of a table-based database) is written in each data record, the generational data field recording a version number, a timestamp, or otherwise some information which orders data records by generation. Thus, a data record, under conventional MVCC techniques, includes not only data in accordance with a schema of a KV store (i.e., a KV store may be constructed to store structured or unstructured data, organized into various fields and relationships therebetween, which may be indexed and sortable in manners as contemplated by maintainers and consumers of the KV store), but furthermore is expanded to include a generational index field which places a snapshot of the data record in generational ordering among other snapshots of the same data record.

Thus, according to snapshot isolation techniques as known in the art, leveraging such an index field, the KV store engine 110 may establish a singular index of snapshot times for each data record; for every transaction pertaining to that data record, therefore, the KV store engine 110 may determine a transaction time, then look up the transaction time in the singular index of snapshot times for the data record to retrieve a snapshot corresponding to the transaction time.

However, in large-scaled data storage systems, the addition of a generational index field to all data records of a KV store greatly compounds storage space consumed by data which does not contribute to the schema of the KV store as constructed. In this regard, generational index fields may subsequently be described as "extra-schema data" in the present disclosure, for brevity. Therefore, according to example embodiments of the present disclosure, as shall be subsequently described, a KV store engine 110 implements snapshot isolation without adding generational index fields to data records.

In either case, the KV store engine 110 is configured to receive, from the storage system 100 and components thereof and/or from any number of end devices 108 by a communication protocol, file and/or data operation calls on persistent storage, which may include one or more of each type of operation conceptualized as "CRUD" in the art: one or more create operation(s), one or more read operation(s), one or more update operation(s), and one or more delete operation(s), each acting upon files and/or data on persistent storage, without limitation thereto. For brevity, the set of such operations implemented by the KV store engine 110 may be referred to as "persistent storage transactions."

It should be understood that all kinds of operation calls according to example embodiments of the present disclosure may make data queries as described above, and, in accordance with implementations of concurrency control, such data queries may be snapshot queries. Thus, the KV store engine 110 may be configured to implement all kinds of persistent storage transactions by returning data record(s) based on a query time; details of such implementations shall be described subsequently.

According to example embodiments of the present disclosure, the KV store engine 110 is configured to generate a snapshot read timestamp corresponding to each persistent storage transaction. Regardless of whether the transaction causes an update to one or more record(s), the transaction will query one or more record(s), which will at least be read from the KV store; therefore, the snapshot read timestamp corresponds to a query time as conceptually described above. The KV store engine 110 may include a transaction timestamp generating module, which is operative to generate this snapshot read timestamp. However, it should be understood that the snapshot read timestamp is derived from a system timestamp of a checkpoint operation, as shall be described subsequently.

According to database transaction guarantees as known to persons skilled in the art, such as atomicity, consistency, isolation, and durability ("ACID"), consistency in the present context may ensure, for example, that the KV store engine 110 will perform each persistent storage transaction upon a snapshot of one or more data records which reflects a state in time as of the time of the respective transaction. In other words, the transaction should not be performed upon a snapshot which reflects a state in time earlier than the time of the respective transaction, or a snapshot which reflects a state of time later than the time of the respective transaction. Moreover, in the event that a first persistent storage transaction would update one or more data records, but other (second, third, etc.) transactions have already updated snapshots of those one or more data records reflecting states of time later than the time of the first respective transaction, the KV store engine 110 will not commit the first transaction on persistent storage, thus preventing the data records from being potentially corrupted as a result of updates being committed in an inconsistent manner.

However, as described above, according to example embodiments of the present disclosure, a KV store engine 110 implements snapshot isolation without adding generational index fields to data records. Consequently, each snapshotted data record does not contain extra-schema data indexing the time of the state of the snapshot, and thus the KV store engine 110 cannot directly look up the time of any given transaction in a singular index of snapshot times. Thus, as shall be subsequently described, according to example embodiments of the present disclosure, a KV store engine 110 implements granularly timestamped snapshot lookup instead of singularly indexed snapshot lookup as a basis for concurrency control.

The KV store engine 110 may be further configured to execute persistent storage transactions by performing file and/or data operations on collective hosted storage 112 of any number of storage host(s) 102 of the storage system 100. File and/or data operations may include logical file or data operations such as creating files and/or data store entries, deleting files and/or data store entries, reading from files and/or data store entries, writing to files and/or data store entries, renaming files and/or data store entries, moving a file and/or data store entry from one location to another location, and the like, as supported by a file system configured on the hosted storage 112. The KV store engine 110 may perform all file system and/or data store management system functions required to support such operations, and furthermore may be configured to perform such file operations by making calls to storage device drivers, or may be configured to perform such file operations by making calls to hardware-specific interfaces in place of storage device drivers.

A file system configured on the hosted storage 112 may address files and/or data stored on the hosted storage 112 according to extents. According to a file system, data may be stored as logical blocks of a predetermined size, mapped to corresponding physical addresses on storage. An extent, as known to persons skilled in the art, may indicate a range of contiguous blocks on storage; within an extent, individual blocks are further specified as offsets of the extent. Thus, a file system configured on the hosted storage 112 according to example embodiments of the present disclosure may utilize extent-offset addressing to provide virtual addresses mapped to physical locations of each block on the storage. Example embodiments of the present disclosure may incorporate any among various file systems configured to utilize extent-offset addressing as known to persons skilled in the art, such as XFS, ext4, and the like. Upon an extent being written to full capacity, the file system marks the extent as sealed; the file system can no longer write to an extent which is sealed.

Hosted storage 112 may be hosted at storage host(s) 102 of the storage system 100. Storage devices may be implemented as non-volatile storage media, particularly as flash memory such as solid state drives ("SSDs"), which may exhibit certain advantages and disadvantages. For example, while implementations of flash memory may permit fast random-access reads of data, random-access writes of data may exhibit greater latency compare to memory, especially with respect to operations such as inserts and deletes in indexed data structures. While memory random-access is byte-addressable, persistent memory implementations based on flash memory may only be able to write data upon erasing data blocks of fixed size, resulting in the phenomenon of write amplification as known in the art, quantified by amount of storage write activity relative to quantity of data written. In particular, high write amplification may be caused by write accesses of size smaller than the access granularity of the underlying flash memory, leading to a cascade of moving and rewriting operations which substantially increase write latency. This phenomenon may be particularly exacerbated in the case of random access, such as inserts, deletes, and the like.

Hosted storage 112 may be implemented as physical and/or virtual storage devices implementing read and write operations, data structures, storage device layout, and the like. Collectively, hosted storage 112 across networked storage hosts 102 of the storage system 100 may be referred to as "cloud storage," and any number of such storage devices may be virtualized as one storage device for the purpose of executing persistent storage transactions from one or more end devices 108.

Hosted storage 112 may include various forms of computer-readable storage media, which may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

It should be understood that storage devices may be implemented to permit write operations according to different data structures, disk layouts, and logic. For example, storage devices may be implemented to store sequential data structures which permit write operations in an append-only fashion, though such data structures may ultimately be erased to reclaim space. Alternatively, storage devices may be implemented to store data structures which are mutable at any time, such as tracks and sectors on a magnetic disk. In any case, block-based basic data structures may be written to the storage device, and it should be understood that magnetic disks, though conventionally implementing freely mutable data structures, may also implement sequential data structures which are written to in an append-only fashion. According to example embodiments of the present disclosure, hosted storage 112 may at least include some number of physical and/or virtual storage devices implemented at least in part using flash memory, such as solid-state drives ("SSDs"). However, hosted storage 112 may include any combination of magnetic disks, flash memory, and the like, on which write operations are implemented to write to sequential data structures in an append-only manner. Example embodiments of the present disclosure as described below may be understood as implemented and proceeding substantially similarly regardless of the nature of the underlying storage devices.

The KV store engine 110 may configure hosted storage 112 collectively making up storage of the storage system 100 to store files and/or data store entries, as described above, in some number of basic data structures, which further store metadata describing layout and locations of each stored file and/or data store entry. Such metadata may configure a KV store engine 110 to map a logical file and/or data entry, as specified by an end device 108, to each location where data of that logical file and/or data entry is stored across cloud storage on one or more devices of hosted storage 112. Details of such mapping shall be subsequently elaborated upon.

Data stored at hosted storage 112 may be logically organized into files. In the context of a KV store according to example embodiments of the present disclosure, a file may refer to a logical collection of a large, arbitrary number of records sorted by one or more indices. For example, indices may be keys mapped to each record, such that all records of a file are sorted by respective corresponding keys. According to example embodiments of the present disclosure, a file may reside in memory or on storage of a storage host. A file may be mutable while residing in memory, and may be immutable while residing on storage. For example, a file according to example embodiments of the present disclosure may be a sorted string table ("SSTable"). Files may be generally substantially large in size, commonly ranging from hundreds of megabytes ("MB") to gigabytes ("GB") in size.

In the context of a KV store based on a log-structured merge ("LSM") tree according to example embodiments of the present disclosure, files implemented as described above may be further organized into multiple levels of the LSM tree. Levels may be conceptually organized into higher and lower levels, where a topmost level stores in-memory files newly inserted into a write buffer of the KV store (as shall be described subsequently), and each lower level stores files written to storage of a storage host. Each lower level may store records sorted on a per-level basis, such that all records of files of a same level are sorted across all files of the same level, with each file encompassing a sub-range of the entire range of the level.

Each level may have a target level size defined in bytes, where the KV store is configured to perform consolidation (as shall be described subsequently) to maintain files collectively organized in each level at a total level size approximately less than or equal to the target level size.

Furthermore, each lower level may have a target level size which is an order of magnitude larger than that of the preceding higher level. For example, a first lower level may have a target level size of 300 MB; a second lower level below the first may have a target level size of 3 GB; a third lower level below the second may have a target level size of 30 GB; a fourth lower level below the third may have a target level size of 300 GB; and so on.

A KV store engine 110 implemented according to example embodiments of the present disclosure may configure a storage system 100 to service data query and data storage workloads originating from large numbers of end users of a KV store hosted on the storage system 100. The storage system 100 may be arbitrarily scaled in capacity of hosted storage 112 and, accordingly, numbers of concurrent workloads serviceable on a concurrent basis. However, for servicing of concurrent workloads, the KV store engine 110 according to example embodiments of the present disclosure further implement the storage system 100 to perform concurrency control, by snapshot isolation as described above; such concurrency control may be performed by implementing persistent storage transactions in response to snapshot queries made by operation calls, wherein data record(s) are returned based on a query time. Moreover, to alleviate excessive consumption of storage space by extra-schema data such as generational index fields, the KV store engine 110 according to example embodiments of the present disclosure further implements resolving the snapshot queries by returning data record(s) according to granularly timestamped snapshot lookup instead of singularly indexed snapshot lookup. Details of these implementations shall be described subsequently.

Figure 2A:
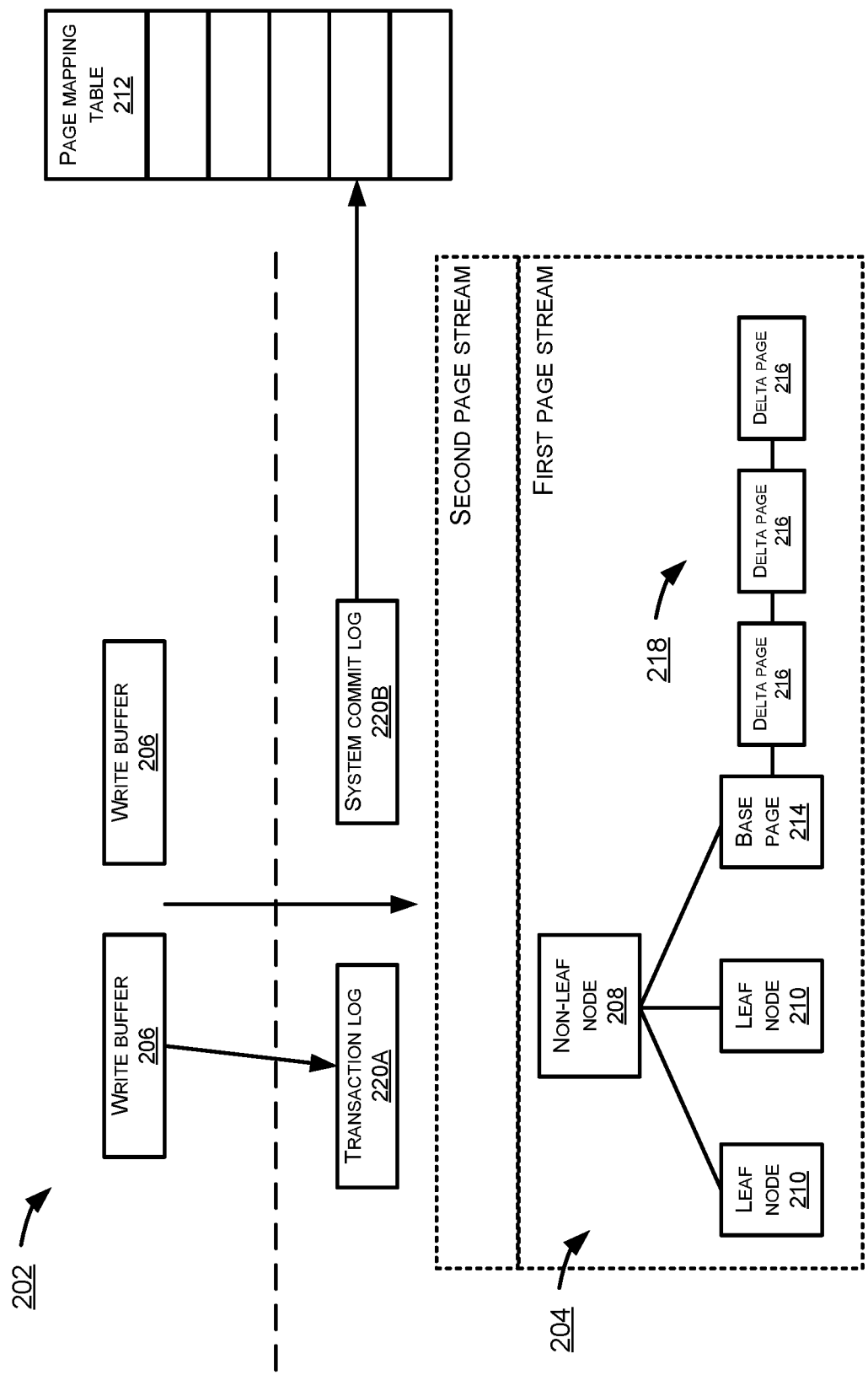
FIGS. 2A and 2B illustrate multiple-tiered sorted data structures implemented in memory and storage, according to example embodiments of the present disclosure.

FIG. 2A illustrates multiple-tiered sorted data structures implemented in memory and storage, according to example embodiments of the present disclosure. In a computing system, which may be a storage host as described above according to example embodiments of the present disclosure, a sorted data structure 202 is implemented in memory of the computing system, and an indexed sorted data structure 204 is implemented on storage of the computing system. The sorted data structure 202 may include a write buffer 206, each write buffer being implemented as a sorted data structure which receives insertions of elements. Elements of each write buffer should be sorted, and insertions into each write buffer should maintain the respective sorted order of that write buffer. Thus, each write buffer may be implemented as a sorted data structure wherein inserts are guaranteed in sorted order, such as a skip list; a sorted data structure wherein inserts cause the data structure to be rearranged in sorted order, such as a red-black tree; and the like. Moreover, such sorted data structures are generally implemented such that queries and insertions may be performed in logarithmic time, according to algorithms as known to persons skilled in the art.

Each insertion into a write buffer 206 may implement a persistent storage transaction. The KV store engine 110 may be configured to record each such persistent storage transaction in a transaction log 220A in storage of the computing system. Each transaction recorded in a transaction log 220A may, after commitment to storage of the computing system, be implemented by inserting an element into a write buffer as described above.

A first write buffer 206 may continue to accept inserted records until the size of that first write buffer reaches a record count threshold or a memory usage threshold. Thereupon, the KV store engine freezes the first write buffer as immutable and queues the first write buffer to be flushed into the indexed sorted data structure 204 on storage, according to a checkpoint operation as shall be described subsequently.

While the first write buffer is frozen as immutable, the KV store engine creates a second write buffer, which may accept further record insertions. Thus, according to example embodiments of the present disclosure, the KV store engine may ensure that a non-immutable write buffer is always available to accept record insertions.

Figure 3A:
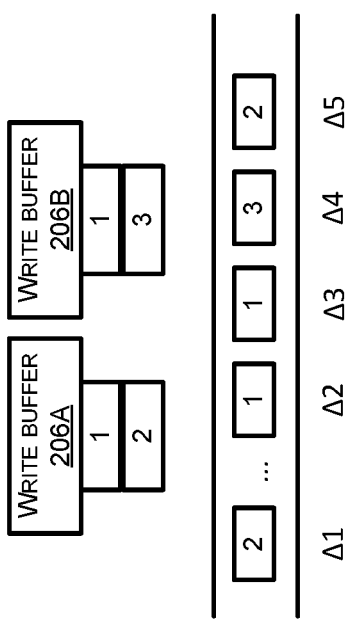
FIGS. 3A through 3D illustrate checkpoint operations of concurrent write buffers according to example embodiments of the present disclosure.

FIGS. 3A through 3D illustrate checkpoint operations of concurrent write buffers according to example embodiments of the present disclosure. FIG. 3A shows the results of appending contents of two write buffers 206A and 206B into a page stream. Write buffer 206A has received an update to a record keyed 1 and an update to a record keyed 2; write buffer 206B has received an update to the same record keyed 1 and an update to record keyed 3. Each of these updates, upon being checkpointed, may be appended to a second page stream (as shall subsequently be described) as a delta page in the order of its system timestamp.

Thus, it may be seen that following an already appended delta page updating the record keyed 1 at time 1 (notated as delta page Δ1 henceforth), the updates of write buffer 206A are appended with the update to the record keyed 1 at time 2 (notated as delta page Δ2 henceforth) and the update to the record keyed 2 at time 5 (notated as delta page Δ5 henceforth). However, in between those two delta pages, the updates of write buffer 206B are appended with the update to the record keyed 1 at time 3 (notated as delta page Δ3 henceforth) and the update to the record keyed 3 at time 4 (notated as delta page Δ4 henceforth).

Each page stream may be a sequentially-written data structure, where the KV store engine is configured to insert base pages into the first page stream and insert delta pages into the second page stream. Base pages and delta pages are described in further detail subsequently. The first page stream and the second page stream are both part of the indexed sorted data structure 204.

According to example embodiments of the present disclosure, the KV store engine 110 is configured to generate a system timestamp corresponding to each checkpoint operation. Any persistent storage transaction which causes an update to one or more record(s) will not only query one or more record(s), but will also write to those record(s) in the KV store; therefore, the snapshot read timestamp corresponds to a query time as conceptually described above. The KV store engine 110 may include a checkpoint timestamp generating module, which is operative to generate a system timestamp for a checkpoint operation, and then generate a checkpoint read timestamp based on the system timestamp. Additionally, the transaction timestamp generating module, as described above, is further operative to generate a commit timestamp for a persistent storage transaction (subsequently a "transaction commit timestamp"), and then generate a snapshot read timestamp as described above based on the transaction commit timestamp.

It should be understood that according to example embodiments of the present disclosure, system timestamps are generated at a less frequent timescale than transaction commit timestamps. The transaction timestamp generating module may generate a transaction commit timestamp for each persistent storage transaction, such as at the time that update(s) of the respective transaction are committed to storage. In contrast, the checkpoint timestamp generating module may generate a system timestamp for each checkpoint operation, such as at the time that each respective checkpoint operation starts.

It should further be understood that according to example embodiments of the present disclosure, all timestamps may be generated in memory, alongside the sorted data structure 202. However, upon records being flushed to storage at the indexed sorted data structure 204, only system timestamps may be flushed to storage alongside; transaction commit timestamps and snapshot read timestamps may be discarded, while remaining in memory of the storage system 100.

According to example embodiments of the present disclosure, transaction commit timestamps are recorded in write buffers 206 (as long as corresponding updates have not yet been flushed to storage); transaction commit timestamps may monotonically increase in numeric sequence, and, regardless of whether multiple write buffers are concurrently receiving writes or not, each write buffer includes a consecutive, non-overlapping sequence of transaction commit timestamps. Therefore, traversing each write buffer 206 may return a mutually exclusive (to each other write buffer), non-overlapping sequence of transaction commit timestamps.

Furthermore, according to example embodiments of the present disclosure, each write buffer 206 includes a buffer timestamp, which is derived from a system timestamp. As described herein, a new write buffer is created after a previously open write buffer is frozen as immutable, whereupon the frozen write buffer is flushed to storage in a checkpoint operation. Thus, whenever a write buffer is created, a new system timestamp is also generated. According to example embodiments of the present disclosure, therefore, each write buffer may be uniquely identified by a system timestamp. Therefore, at the time that each write buffer is created, the KV store engine 110 is configured to assign the prior latest system timestamp (which was generated during a checkpoint operation flushing the previous write buffer to storage) to the newly created write buffer as its corresponding write buffer timestamp.

However, it should be noted that system timestamps do not correspond to write buffers one-to-one, because system timestamps may be generated for events other than checkpoint operations, as shall be described subsequently.

Figure 2B:
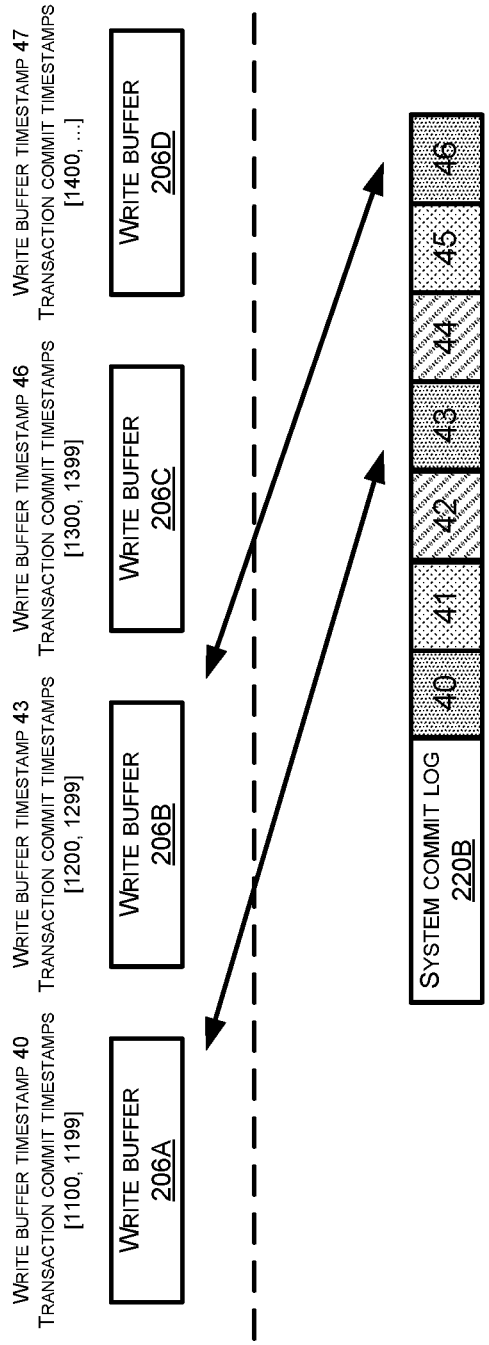

FIG. 2B illustrates implementation of transaction commit timestamps and write buffer timestamps upon multiple-tiered sorted data structures implemented in memory and storage, according to example embodiments of the present disclosure. Four write buffers 206A, 206B, 206C, and 206D are illustrated; among these, write buffers 206A, 206B, and 206C have been frozen and are immutable, and write buffer 206D is open and accepting record insertions.

FIG. 2B further illustrates a system commit log 220B. The KV store engine 110 may be configured to record each update to a page mapping table 212 (as shall be described subsequently), including checkpoint operations, consolidation operations (as shall be described subsequently), tree growing operations (as shall be described subsequently with reference to splitting pages), tree shrinking operations (as shall be described subsequently with reference to merging pages), and garbage collection operations (as shall be described subsequently) in the system commit log 220B in storage of the computing system. Each operation recorded in a system commit log 220B may, after commitment to storage of the computing system, be implemented by updating the page mapping table 212.

It should further be understood that such operations resulting in updates to a page mapping table 212 (subsequently referenced collectively as "mapping update operations," for brevity) may be subsequently recorded in a second recovery log (as shall be described subsequently) after respective updates to the page mapping table 212 are performed.

As shown in FIG. 2B, the write buffers 206A, 206B, 206C, and 206D each includes a mutually exclusive transaction commit timestamp range. The write buffer 206A includes transaction commit timestamps in the [1100, 1199] range, inclusive. The write buffer 206B includes transaction commit timestamps in the [1200, 1299] range, inclusive. The write buffer 206C includes transaction commit timestamps in the [1300, 1399] range, inclusive. The write buffer 206D includes transaction commit timestamps in the [1400, 1499] range, inclusive.

Moreover, as shown in FIG. 2B, the write buffers 206A, 206B, 206C, and 206D each includes a write buffer timestamp corresponding to a system timestamp. The write buffer 206A includes the write buffer timestamp 40; write buffer 206A was created some time after the time of the checkpoint operation with system timestamp 40, so at this time the prior latest system timestamp was 40. Furthermore, FIG. 2B shows that write buffer 206A was flushed to storage in the checkpoint operation with system timestamp 43. The write buffer 206B includes the write buffer timestamp 43; write buffer 206B was created some time after the time of the checkpoint operation with system timestamp 43, so at this time the prior latest system timestamp was 43. Furthermore, FIG. 2B shows that write buffer 206B was flushed to storage in the checkpoint operation with system timestamp 46. The write buffer 206C includes the write buffer timestamp 46; write buffer 206C was created some time after the time of the checkpoint operation with system timestamp 46, so at this time the prior latest system timestamp was 46. FIG. 2B does not show the checkpoint operation where write buffer 206C will be flushed to storage, because, while write buffer 206C has been frozen, causing the creation of write buffer 206D, writer buffer 206C has not yet been flushed to storage in a checkpoint operation. The write buffer 206D includes the write buffer timestamp 47, and is still receiving inserts. The system timestamp 40 itself corresponds to a checkpoint operation during which an earlier write buffer (not illustrated) was flushed to storage.

Additional system timestamps in the system commit log 220B include system timestamps 41 and 45, corresponding to respective consolidation operations, and system timestamps 42, and 44, corresponding to respective garbage collection operations. These system timestamps do not correspond to any write buffer timestamps. It should be understood that the consolidation operation timestamped 41 and the garbage collection operation timestamped 42, in that order, were performed by the KV store engine 110 after the checkpoint operation timestamped 40 and before the checkpoint operation timestamped 43, and the garbage collection operation timestamped 44 and the consolidation operation timestamped 45, in that order, were performed by the KV store engine 110 after the checkpoint operation timestamped 43 and before the checkpoint operation timestamped 46.

Figure 3B:
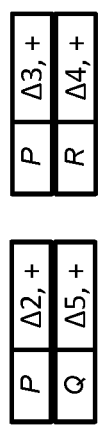

FIG. 3B shows the results of mapping the delta pages of FIG. 3A to PIDs. By traversing the indexed sorted data structure 204 by a search as known to persons skilled in the art, the delta page Δ2 is mapped to a page having PID P, and the delta pages Δ5 is mapped to a page having PID Q; furthermore, the delta page Δ3 is mapped to the same page having PID P, and the delta page Δ4 is mapped to a page having PID R.

Figure 3C:
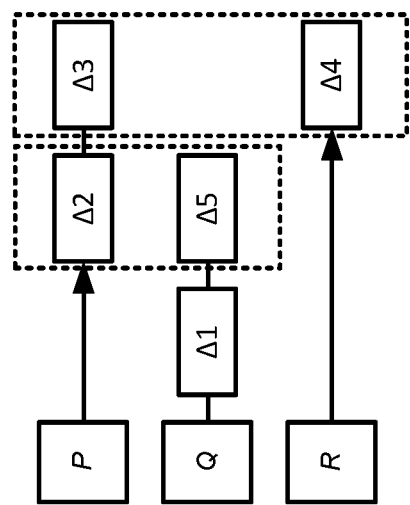

FIG. 3C shows the results of appending the delta pages of FIG. 3B to the respectively mapped pages having PIDs P, Q, and R. The delta page Δ1 has also been appended. It should be noted that the delta pages are collected together by broken lines to show relationship in terms of write buffers; the broken lines do not indicate any temporality.

Figure 3D:
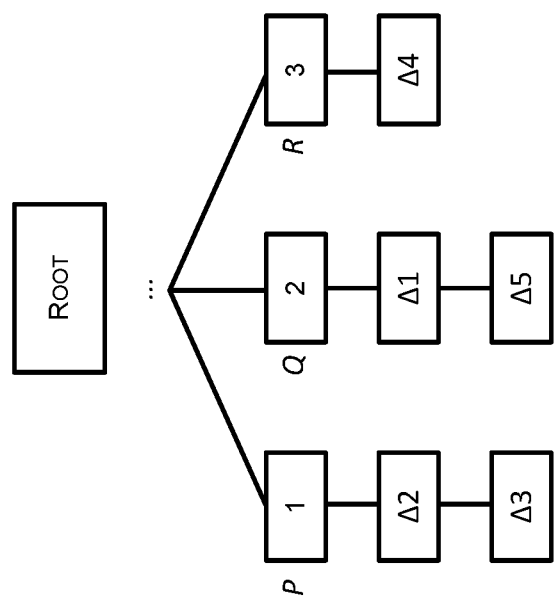

FIG. 3D shows the results of FIG. 3C in the leveled hierarchy of the indexed sorted data structure 204.

In summary, mapping update operations according to example embodiments of the present disclosure, including checkpoint operations, consolidation operations, tree growing operations, tree shrinking operations, and garbage collection operations may each be performed by the KV store engine 110 according to substantially and at least the following steps: the KV store engine 110 generates a system timestamp by the checkpoint timestamp generating module; the KV store engine 110 inserts base page(s) into the first page stream and/or inserts delta page(s) into the second page stream; and the KV store engine 110 records each update to a page mapping table 212 in the system commit log 220B, and performs each update upon the page mapping table 212. However, it should be understood that, while updates to a mapping table 212 may only be recorded to a system commit log 220B one at a time in serial (and thus updates to the page mapping table 212 may only be performed one at a time in serial), the KV store engine 110 may perform any number of page insertions into the first page stream and/or any number of page insertions into the second page stream concurrently, arising from any number of mapping update operations being performed concurrently. Consequently, the risk of multiple concurrent mapping update operations being performed upon inconsistent data record(s) of the KV store, in the absence of concurrency control, is substantial.

It should be understood that, initially, an indexed sorted data structure 204 is empty before any inserted records have been flushed to storage. In such cases, the KV store engine performs an initial checkpoint operation by creating the indexed sorted data structure 204 based on the delta pages checkpointed from one write buffer, and no other checkpoint operations are performed for any other write buffers until the indexed sorted data structure 204 is created. The indexed sorted data structure 204 may be created by any algorithm suitable to build a leveled data structure indexed and sorted by keys, as known to persons skilled in the art.

An advantage of concurrent write buffers as described herein is that each separate write buffer operates concurrently, independent of each other write buffer; checkpoint operations are also performed for each write buffer independent of each other write buffer, so that data is committed from memory to storage in an efficient manner. Furthermore, insertions in each write buffer is checkpointed in mutually chronological order, so that chronological sequence of delta pages is maintained.

According to example embodiments of the present disclosure, a KV store engine may be configured to perform a key-based query starting at the sorted data structure 202, to determine whether there is a key hit at any of the records written to memory and not yet flushed to storage. In the event that the key-based query misses at the sorted data structure 202, the KV store engine then performs the key-based query in storage at the indexed sorted data structure 204, as shall be described subsequently.

The indexed sorted data structure 204 may organize data stored at the computing system. Data stored at the indexed sorted data structure 204 may be logically organized into pages. Such pages may be organized into a tree structure, wherein a page may make up each non-leaf node 208 of the tree structure and each leaf node 210 of the tree structure. In the context of a KV store according to example embodiments of the present disclosure, a page may constitute a collection of keys, such that each key at a non-leaf node points to another page (which may be a non-leaf node or a leaf node), and each key at a leaf node is mapped to a record stored elsewhere on storage, not within the indexed sorted data structure 204. As keys do not contain record data, each page may be fixed in size and may be a few kilobytes in size. Consequently, the indexed sorted data structure 204, being organized into pages rather than files, occupies much less storage space than a LSM tree organized into files as described above.

According to example embodiments of the present disclosure, the tree structure as described above may be further organized into multiple levels. Levels may be conceptually organized into higher and lower levels, where only pages at a bottommost level (i.e., leaf nodes of the tree structure) include keys mapped to records.

Moreover, each page of the indexed sorted data structure 204 may be a virtual page, constituting a logical page identifier ("PID"), which is further mapped to a physical page address residing on storage. Each key at a non-leaf node may point to another page by a PID of that page, but may not point to another page by a physical page address. The indexed sorted data structure 204 may record such a mapping between a PID and a physical page address in a page mapping table 212, the page mapping table 212 also being part of the indexed sorted data structure 204. According to example embodiments of the present disclosure, physical page addresses and PIDs may both be specified in extent-offset format as described above.

In contrast, a page mapping table 212 according to example embodiments of the present disclosure does not have a size floor, and may be arbitrarily small in size, since any number of mappings of the indexed sorted data structure 204 may be trivial translations, and thus not initially recorded in the page mapping table 212.

The indexed sorted data structure 204 may be updated in an append-only fashion, by receiving writes on a sequential, append-only basis. For each page of the indexed sorted data structure 204, updates directed to that page may be appended to that page (subsequently referred to as a "base page," in the context of updates to the base page), as a page describing updates to the base page 214 (subsequently referred to as a "delta page," in the context of updates to the base page). Each subsequent delta page 216 appended to a same base page is appended into a same chain (subsequently referred to as a "delta chain").

The physical page address of the base page 214 may be trivially translated to a PID, and the KV store may map the trivially translated PID to the physical page address, then establish a delta chain 218 for the PID of the base page 214; thus, each delta page 216 appended to the same base page 214 is also applied to the same PID of the base page 214.

According to example embodiments of the present disclosure, each update to a base page may be written to the first page stream, as described above. Each delta page written to a first page stream has a physical page address, but physical page addresses of delta pages are not further mapped to additional PIDs.

For each base page 214 or delta page 216 in a delta chain 218, a mapping from a physical address to a PID of the base page or delta page may be recorded in a mapping data structure including at least the following elements: a system timestamp (as shall be described subsequently); a pointer to a next page of the same delta chain; a retiring chain pointer to a side delta chain of delta pages (so that after a consolidation of delta pages, the pre-consolidation delta pages remain active for ongoing, unfinished read operations, as shall be described subsequently with reference to side-chaining operations); a physical page address to which a PID of the base page or delta page is mapped; and a union structure operative to configure a bloom filter of the indexed sorted data structure 204. For a base page 214, the union structure may be a pointer to a bloom filter of the base page in its parent page in the indexed sorted data structure 204; for a delta page 216, the union structure may be a union of 8-byte hashes of all keys of the delta page 216.

Upon a key-based query missing at the sorted data structure 202, the KV store engine then performs the key-based query in storage at the indexed sorted data structure 204. In the event that the key-based query is a point lookup query, the KV store engine may input the key into the bloom filter, and then only perform a key-based search of the indexed sorted data structure 204 in the event that the bloom filter does not return a negative output. In the event that the key-based query is a range query, the KV store engine may search the indexed sorted data structure 204 by traversing keys of each page therein and their respective delta chains 218, the traversal process being described subsequently.

It should be understood that the KV store engine may search an indexed sorted data structure 204 by any search algorithm suitable for an indexed sorted data structure as known to persons skilled in the art. Furthermore, during this search, in order to retrieve queried data from storage, the KV store engine translates each PID of a page by performing a mapping retrieval operation. The KV store engine looks up each PID in the page mapping table 212; each PID not found in the page mapping table 212 may be deemed a trivial translation, and thus the KV store engine may directly access a physical page address on storage that is the same extent-offset address as the PID. However, each PID found in the page mapping table indicates that the page has been updated, and thus the KV store engine must further traverse a delta chain of the page to retrieve all updates to the page. In the event that a read timestamp of the read operation is later than a system timestamp of a head of a delta chain of the page (reflecting the latest system timestamp of the delta chain), the KV store engine may traverse the delta chain to retrieve delta pages. However, in the event that a read timestamp of the read operation is earlier than a system timestamp of the head of the delta chain of the page, the KV store engine must traverse a side delta chain as described above to retrieve pre-consolidation delta pages.

The above describes an advantage of trivial translation implemented in a page mapping table: the page mapping table does not record every mapping of a PID to a physical page address. Trivial translations allow mappings of a number of physical pages to be omitted, enabling page mapping tables to be arbitrarily small in size without a size floor, and simplifying processing workload of read operation retrievals from storage.

As referenced above, upon a delta page 216 being appended into the delta chain 218, a system timestamp of the delta page 216 may be written into a mapping data structure. Thus, with each delta page 216 representing an update to a same base page 214, each system timestamp therefore determines the order that those updates are applied to the base page 214. Furthermore, the KV store engine may be configured to append multiple delta pages 216 to a delta chain 218 of the same base page 214 in timestamp order, so that traversal of the delta chain 218 iterates through each delta chain 216 in timestamp order, such that delta chains 216 may be scanned in one traversal rather than multiple traversals.

Furthermore, according to example embodiments of the present disclosure, the KV store engine may further implement a first recovery log and a second recovery log (not illustrated). The first recovery log and the second recovery log may each be sequentially-written data structures, where the KV store engine is configured to record updates to pages of the indexed sorted data structure 204 in the first recovery log, and record updates to the page mapping table 212 to the second recovery log. By such implementations the KV store engine may perform at least two types of recovery operations: in the event of a failure of the storage system, the KV store may replay the second recovery log to restore physical-to-virtual address mapping. Moreover, the KV store engine may maintain read replicas in up-to-date states by constantly replaying the second recovery log. In either case, the KV store engine may further replay the first recovery log to further restore the latest updates to the indexed sorted data structure 204, which have not yet necessarily been flushed to storage.

Figure 4:
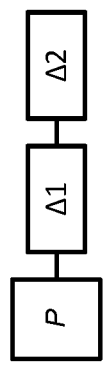
FIG. 4 illustrates a PID of a base page, where a delta chain of multiple delta pages has been appended to the base page.

FIG. 4 illustrates a PID of a base page (the PID having been mapped to a physical page address, which is not illustrated herein), where a delta chain of multiple delta pages has been appended to the base page (and thus appended to the PID of the base page). Herein and for subsequent reference, the PID of the base page is referred to as "P," and the two delta pages are referred to as "Δ1" and "Δ2."

According to example embodiments of the present disclosure, while delta chains may grow indefinitely to arbitrary lengths, upon delta chains growing to substantial lengths, traversal of the full delta chain may result in heightened read amplification. Consequently, example embodiments of the present disclosure further implement a consolidation operation. The KV store engine consolidates delta pages appended to a base page by performing a merge-sort operation upon each delta page of a delta chain to the base page. Furthermore, the KV store engine may consolidate delta pages appended to a base page with each other and with the base page in the event that the delta pages of the delta chain are, collectively, larger than the base page by a comparative ratio (or, equivalently, the base page is smaller than the collective delta pages of the delta chain by a comparative ratio). In the event that the comparative ratio is small, the base page is not consolidated, so as to avoid growing write amplification unnecessarily.

Conditions as described above which cause a KV store engine to consolidate delta pages may be generally referred to herein as "consolidation conditions." Each consolidation operation may be manually configurable by an operator of a storage system or a storage host as described herein.

Additionally, upon performing a merge-sort operation upon delta pages and optionally upon a base page, the KV store engine derives some number of merge-sorted records, and respective corresponding keys. The KV store engine then completes the consolidation operation by creating one or more new pages containing the merge-sorted records, and respective corresponding keys. Whether one new page or multiple new pages are created depends on a maximum page size as configured for the KV store engine. The one or more new pages may be appended to a page stream as described above.

The one or more new pages may be written by the KV store engine performing a replace operation, wherein the KV store engine creates a k-way merge iterator to the delta chain containing the merge-sorted delta pages, identifying a highest system timestamp among the delta pages. Furthermore, in the event that the base page is consolidated, the KV store engine sets an overwrite flag in the mapping data structure of the base page, as the base page is to be overwritten (in the event that one new page is written), or rewritten (in the event that multiple new pages are written). An overwrite flag being set may configure the mapping of the base page as invalid in the indexed sorted data structure 204, while indicating that the first delta page of a delta chain is the (new) base page.

However, after completion of such a consolidation operation, the delta chain of the parent index page (either the base page in the event that the base page is not consolidated, or a new base page to be created in the event that the base page is consolidated) does not need to be updated immediately. Instead, the KV store engine may side-chain the one or more new pages to the pre-consolidation delta chain, causing both chains to coexist from the same parent base page, with the parent base page pointing to the one or more new pages, while the pre-consolidation delta chain becomes a side delta chain. In particular, side-chaining may support ongoing, unfinished read operations at past read timestamps; if the delta chain were replaced immediately, ongoing read operations may retrieve delta pages having future timestamps, causing erroneous read behavior.

Figure 5A:
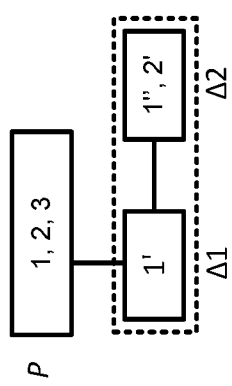
FIGS. 5A through 5C illustrate a consolidation operation and a side-chaining performed by a KV store engine according to example embodiments of the present disclosure.
Figure 5B:
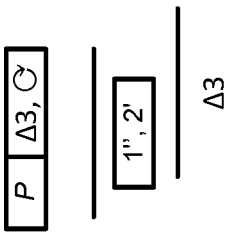
Figure 5C:
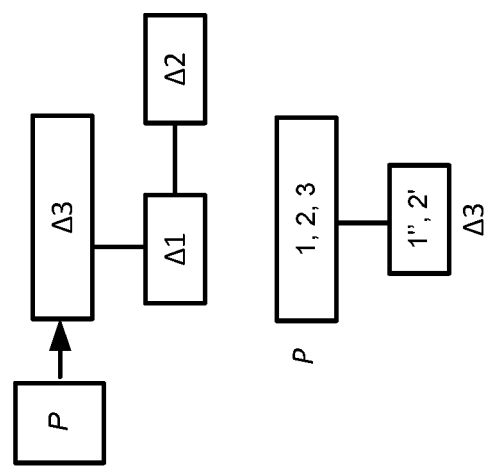

FIGS. 5A through 5C illustrate a consolidation operation and a side-chaining performed by a KV store engine according to example embodiments of the present disclosure.

FIG. 5A illustrates updates described by the two delta pages Δ1 and Δ2 to the base page P. It may be seen that base page P includes records 1, 2, and 3. The delta page Δ1 describes a first updated record keyed 1, notated as 1'. The delta page Δ2 describes a second updated record keyed 1

(which must follow the first update 1'), notated as 1", and an updated record keyed 2, notated as 2'.

FIG. 5B illustrates results of a consolidation operation performed upon the two delta pages Δ1 and Δ2 appended to the base page P. Between the state illustrated in FIG. 4A and the state illustrated in FIG. 4B, it should be understood that, first, the delta pages Δ1 and Δ2 were merge-sorted, resulting in the updated records 1" and 2'. Then, a new delta page Δ3 was created, containing the updated records 1" and 2'. (In this example, the base page P was not consolidated with the delta pages of its delta chain.) FIG. 4B show that the new delta page Δ3 is then written to a page stream of the base page P, causing a local update to the base page P. It should further be understood that the latest system timestamp among the delta pages Δ1 and Δ2 becomes the system timestamp of 43.

FIG. 5C illustrates results of a side-chaining operation performed upon the two delta pages Δ1 and Δ2 and the new delta page Δ3. As shown, the new delta page Δ3 is written to the page stream, where it has a physical page address. The KV store engine replaces the physical page address in the mapping data structure of the base page P with the physical page address, and replaces the system timestamp of the mapping data structure of the base page P with the system timestamp of Δ3 (carried over from the latest system timestamp among the delta pages Δ1 and Δ2). The KV store engine also updates the retiring chain pointer of the mapping data structure of the base page P to point to the side delta chain containing the delta pages Δ1 and Δ2.

According to example embodiments of the present disclosure, the KV store engine may perform a consolidation operation upon the KV store engine detecting a consolidation trigger condition being satisfied. For example, a consolidation trigger condition may constitute any delta chain of the indexed sorted data structure 204 exceeds a certain size, measured in number of delta pages. Alternatively and/or additionally, a consolidation trigger condition may constitute the total number of delta pages of the entire indexed sorted data structure 204 (not just those delta pages of one delta chain) exceeds a certain number.

According to example embodiments of the present disclosure, it should be further understood that a consolidation operation and a side-chaining operation as described above do not modify the structure of the indexed sorted data structure 204. Thus, a KV store engine according to example embodiments of the present disclosure further implements a tree growing operation and a tree shrinking operation.

Additionally, it should be understood that side delta chains do not persist indefinitely; gradually, past read operations will complete and all ongoing read operations will no longer have read timestamps which are earlier than a latest timestamp of the retiring chain. Subsequent to this condition being satisfied, the side delta chain may be marked as stale data to be reclaimed by a garbage collection process. The garbage collection process may be implemented according to epoch-based garbage collection as known to persons skilled in the art, by implementing and incrementing a garbage collection timestamp which lags behind read timestamps of ongoing read operations. The garbage collection process may be operative to reclaim storage occupied by stale data, such as frozen, immutable write buffers after checkpointing; pages invalidated by various operations as described herein; and the like.

Additionally, according to example embodiments of the present disclosure, in accordance with snapshot isolation as described above, the KV store engine may implement a garbage collection process which maintains an advancing garbage collection timestamp. Based on the garbage collection timestamp, the garbage collection process executes in iterations, incrementing the garbage collection timestamp during each iteration. During each iteration of the garbage collection process, the garbage collection process may relocate valid pages of the indexed sorted data structure 204 to the tails of the first page stream and the second page stream. The garbage collection process may then update the page mapping table 212 to reflect the relocated pages.

As described above, pages become stale upon no more operations having earlier timestamps. Thus, delta pages are more likely to become stale, and become stale with greater frequency, than base pages. The first page stream, consequently, is referred to herein as a "hot" stream due to the greater frequency of non-stale base pages, while the second page stream is referred to herein as a "cold" stream. The KV store engine may be configured to reclaim storage occupied by pages from only one stream, thus improving efficiency of garbage collection.

According to example embodiments of the present disclosure, a KV store engine performs a tree growing operation upon a parent index page upon delta chains of the parent index page, created as described above in a consolidation operation, and/or side delta chains of the parent index page, created as described above in a side-chaining operation, growing over a growing threshold in size. The KV store engine then splits the parent index page into multiple pages, which are set as child pages of a new parent index page, where each page may be under a maximum page size as described above. The creation of new child pages may furthermore add a new bottommost level to the indexed sorted data structure 204.

According to example embodiments of the present disclosure, a KV store engine performs a tree shrinking operation upon a parent index page upon delta chains of the parent index page and/or side delta chains of the parent index page falling under a shrinking threshold in size. The KV store engine may then append a merge recipient delta page to the parent index page (in the manner as described above of creating a merge recipient delta page in a page stream, then recording a physical page address of the merge recipient in a mapping data structure of the parent index page). The merge recipient data page may then perform a page rewriting operation, causing one or more child pages of the parent index page to be collectively merge-sorted into a collection of records, which are then written into the merge recipient data page. In this operation, the KV store engine also updates the page mapping table 212 to reflect invalidation of the child pages which have been merged.

Alternatively and/or additionally, the KV store engine performs a tree shrinking operation upon the parent index page itself falling under a shrinking threshold in size. Instead of appending a merge recipient data page to the parent index page, the KV store engine may then perform a page rewriting operation, causing one or more child pages of the parent index page to be collectively merge-sorted with the parent index page. In this operation, the KV store engine also updates the page mapping table 212 to reflect invalidation of the child pages which have been merged.

Generally, shrinking thresholds may be configured so as to rarely trigger tree shrinking operations (i.e., the thresholds are set sufficiently low as to be rarely reached). Such configurations may avoid performing excessive merge-sorting and page rewriting, which may result in greater performance costs than performance benefits.

Furthermore, a KV store engine according to example embodiments of the present disclosure implements a rewrite table, wherein the KV store engine may record pages generated by page rewriting operations as described above. Checkpoint operations and page rewriting operations as described above, if performed concurrently, may lead to erroneous results, since checkpoint operations may append delta pages to base pages which are concurrently rewritten and thus made obsolete. Thus, during a page rewriting operation, the KV store engine further records each page rewrite in the rewrite table. While performing a checkpoint operation, the KV store engine may refer to the rewrite table, comparing system timestamps of the rewrite table to system timestamps of delta pages to be flushed to storage. By reference to the rewrite table, the KV store engine may be configured to perform the checkpoint operation by appending delta pages to a parent index page rather than a child page which has been invalidated during a page rewriting operation having an earlier timestamp than the delta pages.

Furthermore, based on the above-described indexed sorted data structure 204 and KV store engine operations, the KV store engine may perform a delete operation upon the indexed sorted data structure 204. The KV store engine may delete any base page of the indexed sorted data structure 204 by appending an empty delta page to the base page, the empty delta page having a deletion flag set and a deletion timestamp. The KV store engine does not perform the deletion operation until timestamps of all other ongoing operations are later than the deletion timestamp, since concurrent operations referencing deleted pages must be caused to fail. Deletions are further recorded in the rewrite table, as described above, ensuring that the KV store engine may identify pages made invalid by deletion while performing concurrent checkpoint operations and the like.

Figure 6A:
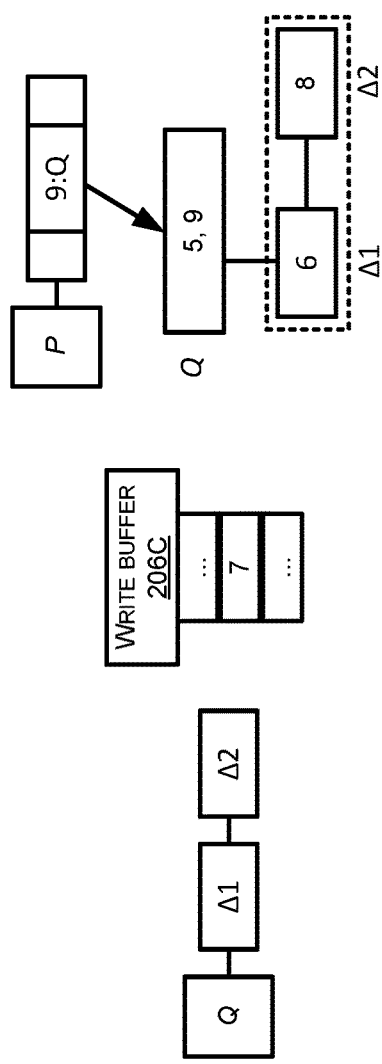
FIGS. 6A through 6C illustrate a KV store engine performing a checkpoint operation and a page rewriting operation concurrently with reference to a rewrite table.
Figure 6B:
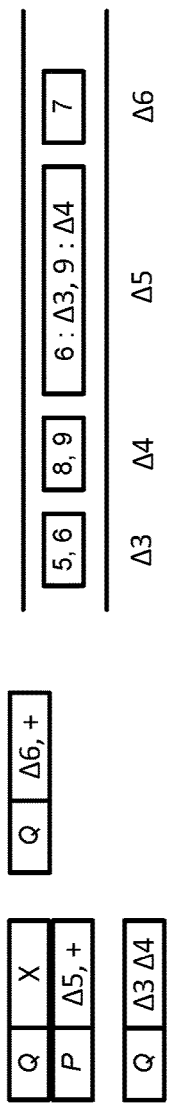
Figure 6C:
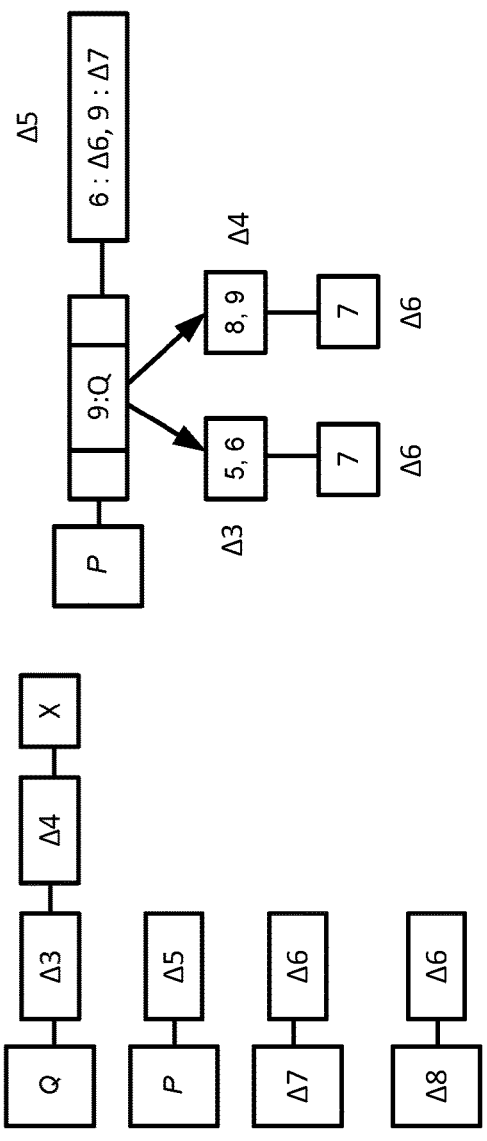

FIGS. 6A through 6C illustrate a KV store engine performing a checkpoint operation and a page rewriting operation concurrently with reference to a rewrite table. FIG. 6A shows that a write buffer 206C has received an update to a record keyed 7. This update, upon being checkpointed, may be appended to a page stream as a delta page in the order of its system timestamp. FIG. 6A also shows that a parent page having PID P has a child page having PID Q, the page Q having records keyed ranging from 5 to 9, and having a delta chain including delta page $\Delta 1$ updating the record keyed 6, and delta page $\Delta 2$ updating the record keyed 8. Suppose, for the purpose of illustration, that the KV store engine is concurrently performing a shrink operation to merge the child page Q into the parent page P, and thus the child page Q having records keyed ranging from 6 to 9 will no longer be valid for the concurrent checkpoint update to the record keyed 7.

FIG. 6B shows that the operations as described in FIG. 6A are recorded in a rewrite table and appended into a page stream in timestamp order. Since the record keyed 7 will be updated by the checkpoint operation, it is recorded in the rewrite table targeting the child page Q and having a timestamp 46, while the remaining records of the child page Q (ranging from 5 to 6, and ranging from 8 to 9) are written into new pages at earlier timestamps, recorded in the rewrite table targeting the child page Q and having timestamps 43 and 44. The child page Q is then merge-sorted into the parent page P at timestamp 45, resulting in the child page Q also being marked for deletion (denoted by "X"). The append order in the page stream reflects the order of these timestamps.

FIG. 6C shows that each of the appends of the page stream are applied to respective pages at their respective timestamps; the rewrite results in two delta chains of the parent page P created at $\Delta 3$ and $\Delta 4$, respectively, and the update at $\Delta 6$ results in a further delta page on each of those chains created at $\Delta 7$ and $\Delta 8$, respectively.

It should be understood, from the above description of the KV store engine 110 performing a checkpoint operation and a page rewriting operation concurrently, that each update of a record may correspond to the KV store engine 110 implementing an individual persistent storage transaction. As a consequence, the KV store engine 110 may be configured to append any number of updates into a page stream on a concurrent basis, where at least some updates being appended concurrently pertain to a same snapshot (i.e., system timestamps of the updates correspond to a same snapshot of the same data record, meaning that it is possible that the updates, if all committed, would cause at least one record to become inconsistent).

Moreover, as mentioned above, the KV store engine 110 may perform any number of page insertions into the first page stream and/or any number of page insertions into the second page stream concurrently, arising from any number of mapping update operations being performed concurrently. Consequently, the risk of multiple concurrent mapping update operations being performed upon inconsistent data record(s) of the KV store, in the absence of concurrency control, is substantial.

Additionally, an individual persistent storage transaction performed by the KV store engine 110 may be performed across data record(s) stored on multiple partitions (as described above) on hosted storage 112 of the storage system 100. Each partition may include a separate indexed sorted data structure 204, including a separate first page stream, second page stream, and page mapping table. Thus, one transaction may be conceptually described as including multiple sub-transactions, each sub-transaction being performed upon data record(s) of a different partition on hosted storage 112 of the storage system 100. The decoupling of a single transaction into updates to be inserted into indexed sorted data structures of multiple partitions, and to be committed across multiple partitions, may result in updates of different sub-transactions being committed out of order. Consequently, cross-partition transactions are another possible cause of transactions, and therefore mapping update operations, being performed upon inconsistent data records of the KV store, in the absence of concurrency control.

Consequently, example embodiments of the present disclosure implement concurrency control over mapping update operations, as shall be described subsequently. After concurrency control has resolved any possible inconsistencies between the concurrent updates, which may be cross-partition updates, the KV store engine 110 may be further configured thereafter to commit the updates appended into a page stream by applying changes in PID-to-physical-page-address mapping into a page mapping table 212; these updates may be performed serially.

Figure 7A:
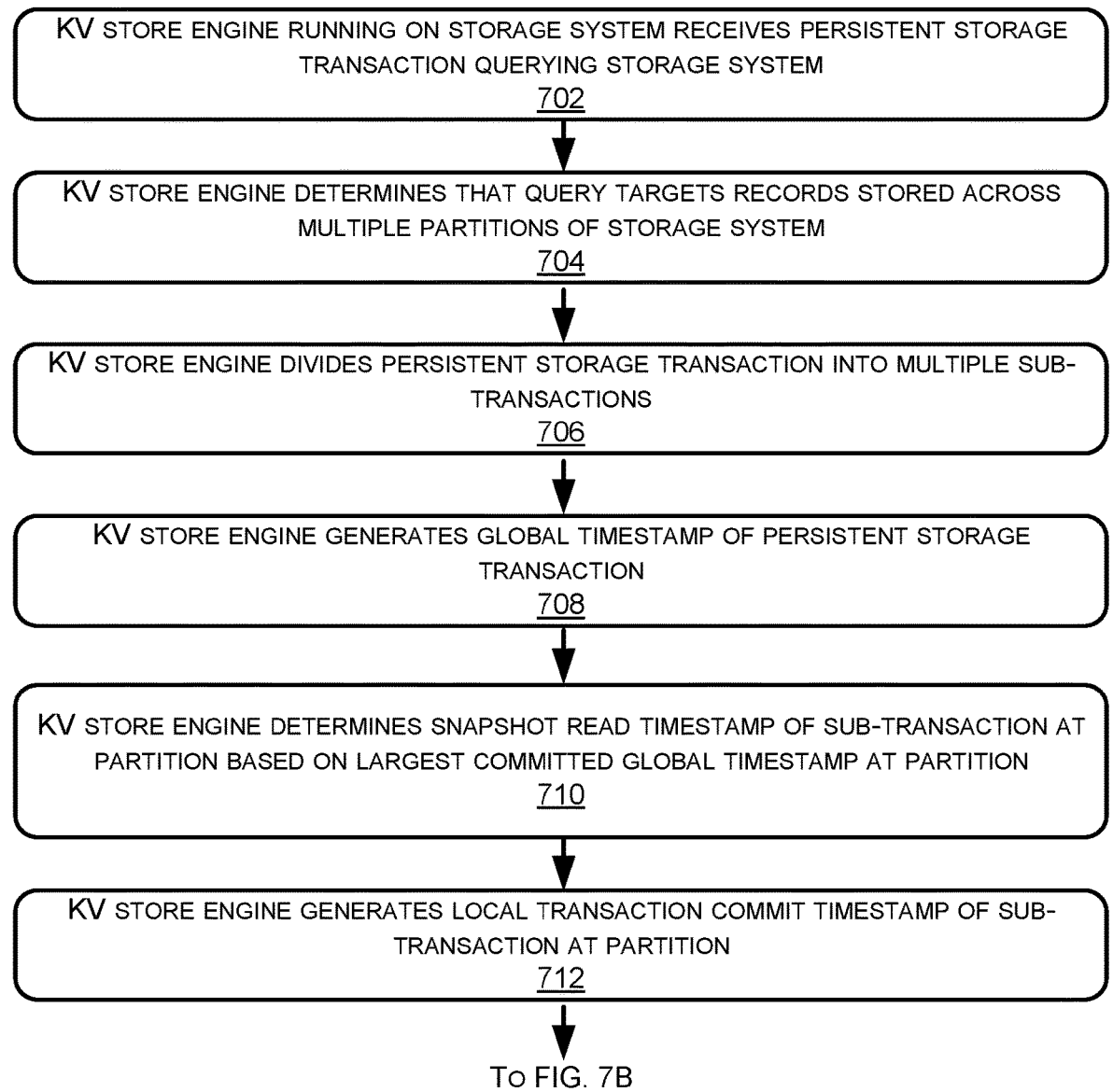
FIGS. 7A and 7B illustrate a flowchart of a mapping update operation committing method according to example embodiments of the present disclosure.
Figure 7B:
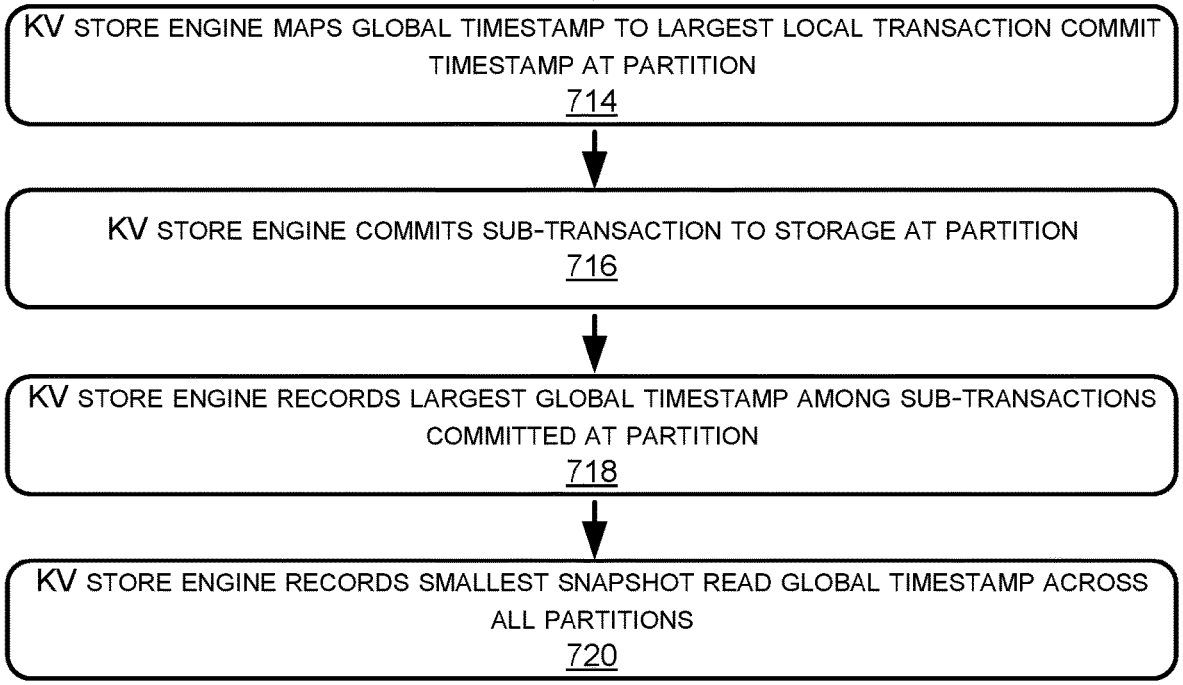

FIGS. 7A and 7B illustrate a flowchart of a mapping update operation committing method 700 according to example embodiments of the present disclosure. According to example embodiments of the present disclosure, the KV store engine 110 further includes a global timestamp generating module. It should be understood that while transaction timestamps and system timestamps as described above may be generated locally at each partition of the storage system 100, the KV store engine 110 may generate a common global timestamp across all partitions of the storage system 100. Thus, any global timestamps generated by the global timestamp generating module may be recorded at one storage host 102, or may be recorded at multiple storage hosts or at each storage host in a synchronized fashion.

At a step 702, a KV store engine running on a storage system receives a persistent storage transaction querying the storage system.

At a step 704, the KV store engine determines that the query targets records stored across multiple partitions of the storage system.

Thus, in a manner as described above, the KV store engine may translate the persistent storage transaction to a mapping update operation, where the mapping update operation includes updates to pages recorded at indexed sorted data structures separately stored at different partitions across hosted storage.

At a step 706, the KV store engine divides the persistent storage transaction into multiple sub-transactions.

In accordance with different partitions targeted by the query of the persistent storage transaction, each sub-transaction may be defined as making a sub-query to only records stored at one particular partition. Thus, the KV store engine may be configured to implement each sub-transaction by a separate mapping update operation targeting an indexed sorted data structure stored at a different partition of the storage system.

At a step 708, the KV store engine generates a global timestamp of the persistent storage transaction.

In the course of implementing each sub-transaction at a partition, while the sub-transaction remains in memory, the KV store engine may be configured to generate a (local) transaction commit timestamp and a (local) snapshot read timestamp; however, before generating the individual local transaction commit timestamps, the KV store engine first generates a global timestamp, which applies to all sub-transactions and their corresponding mapping update operations. The global timestamp further modifies the generation of the local transaction commit timestamp and the local snapshot read timestamp, so as to establish a granularly timestamped concurrency control scheme (over three levels of granularity) which will be further elaborated upon with reference to FIG. 8.

At a step 710, the KV store engine determines a snapshot read timestamp of a sub-transaction at a partition based on a largest committed global timestamp at the partition.

The largest committed global timestamp (which is set as subsequently described with reference to step 718) is the largest global timestamp among sub-transactions committed at the partition. Depending on the subsequent comparison, the snapshot read timestamp will either include the largest local transaction commit timestamp, or the largest local transaction commit timestamp less 1 (local transaction commit timestamps being those subsequently described with reference to step 714).

As described subsequently with reference to step 714, some number of global timestamps have been locally mapped (to some number of largest local transaction commit timestamps), but their corresponding sub-transactions are not yet committed. Among the mapped global timestamps, the smallest mapped global timestamp larger than the largest committed global timestamp is either equal to the largest committed global timestamp, or larger than the largest committed global timestamp. In the former case, the snapshot read timestamp of the sub-transaction is set to the largest local transaction commit timestamp. In the latter case, the snapshot read timestamp of the sub-transaction is set to the largest local transaction commit timestamp less 1.

Moreover, to resolve concurrency control for mapping update operations to be performed for the transaction, a snapshot read system timestamp of a mapping update operation is determined for the sub-transaction based on the snapshot read timestamp of the sub-transaction. This snapshot read system timestamp may also be conceptually thought of as a query time for resolving inconsistency. This process is described in further detail subsequently with reference to FIG. 8.

At a step 712, the KV store engine generates a local transaction commit timestamp of the sub-transaction at the partition.

The KV store engine may perform this step for each sub-transaction at a different partition, and the local transaction commit timestamps may be different among each partition. Thus, for enforcement of consistency, the KV store engine may be further configured to enforce consistency of the local transaction commit timestamps.

At a step 714, the KV store engine maps the global timestamp to a largest local transaction commit timestamp at the partition.

At any given partition, the KV store engine is implementing multiple sub-transactions concurrently at any given time. Each of these sub-transactions was derived from a different persistent storage transaction, and therefore has a different global timestamp. Moreover, each of these sub-transactions may also have a different local transaction commit timestamp. For any sub-transaction, its global timestamp is mapped to the largest local transaction commit timestamp among all of the sub-transactions. It should be understood that during step 712, the KV store engine may see the local transaction commit timestamp for sub-transactions having earlier global timestamps. However, sub-transactions having later global timestamps should not yet exist at this stage, and thus will not be considered.

For example, a partition may have four sub-transactions with the following pairs of global timestamps and local transaction commit timestamps: $(10_G, 100_L)$, $(12_G, 98_L)$, $(14_G, 99_L)$, $(16_G, 102_L)$. Any of the global timestamps earlier than $16_G$, in step 712, will be mapped to the largest prior local transaction commit timestamp, $100_L$, because the $16_G$ global timestamp itself has not yet occurred while these global timestamps were mapped. In contrast, the $16_G$ timestamp is not mapped to the $100_L$ local transaction commit timestamp, because the $102_L$ local transaction commit timestamp is larger.

At a step 716, the KV store engine commits the sub-transaction to storage at the partition.

In other words, as described above, the KV store engine generates a system commit timestamp by the checkpoint timestamp generating module; the KV store engine inserts base page(s) into the first page stream and/or inserts delta page(s) into the second page stream; and the KV store engine records each update to a page mapping table in the system commit log, and performs each update upon the page mapping table. Each of these steps are performed locally at the partition, apart from each other sub-transaction at each other partition.

At a step 718, the KV store engine records a largest global timestamp among sub-transactions committed at the partition.

After committing each sub-transaction, the largest global timestamp is updated. This largest global timestamp confirms that all sub-transactions at the partition having smaller global timestamps have also committed.

At a step 720, the KV store engine records a smallest snapshot read global timestamp across all partitions.

The smallest snapshot read global timestamp may be synchronized across all partitions. The smallest snapshot read global timestamp may control, at each partition, truncation of the mappings between global timestamps and largest local transaction commit timestamp at the partition (they may be discarded for global timestamps up to the smallest snapshot read global timestamp less 1), as shall be described subsequently with reference to FIG. 8.

FIG. 8 illustrates a flowchart of a snapshot read concurrency control method 800 according to example embodiments of the present disclosure. It should be understood that this method may be performed during the method 700 of FIGS. 7A and 7B.

At a step 802, a KV store engine running on a storage system records a largest committed system timestamp and a smallest non-committed transaction commit timestamp.

The KV store engine may informatively determine a largest committed system timestamp, since the KV store engine is configured to commit mapping update operations in order of the system commit log as described above; thus, the largest committed system timestamp guarantees that all smaller system timestamps correspond to mapping update operations committed in storage.

However, determining a largest committed transaction commit timestamp is not informative, since the KV store engine is configured to commit persistent storage transactions out of order. Thus, the smallest non-committed transaction commit timestamp is determined, guaranteeing that all smaller transaction commit timestamps correspond to transactions committed in memory.

At a step 804, the KV store engine sets a snapshot read system timestamp of a mapping update operation to the largest committed transaction commit timestamp.

It should be noted that garbage collection operations are not included among mapping update operations in the performance of step 804.

At a step 806, the KV store engine sets a snapshot read timestamp of a persistent storage transaction based on the largest committed system timestamp and the smallest non-committed transaction commit timestamp.

For example, the snapshot read timestamp may include both the largest committed system timestamp, as well as the smallest non-committed transaction commit timestamp less 1.

At a step 808, the KV store engine returns a merged collection of records based on an upper bound and a lower bound based on the snapshot read timestamp.

The merged collection of records includes updates from the sorted data structure 202 in memory and the indexed sorted data structure 204 in storage, such that a persistent storage transaction may refer to non-committed updates up to a timeframe defined by the snapshot read timestamp. This way, inconsistency is avoided that would result from merely reading data records committed in storage, without regard as to pending, non-committed updates thereto.

It is known to persons skilled in the art of database queries that a merge operation may be performed to query a data store based on an upper bound and a lower bound. In this case, the lower bound of the query may be the largest committed system timestamp, so that previously committed updates are not superfluously included in the response to the query. The upper bound of the query may be the smallest non-committed transaction commit timestamp less 1, so that updates to be committed to storage (upon a checkpoint operation flushing a write buffer to storage) are included in the response to the query.

For example, as illustrated in FIG. 2, assuming that the snapshot read timestamp is set to (46, 1410), where 46 is the largest committed system timestamp, and 1411 is the smallest non-committed transaction commit timestamp less 1. Thus, the lower bound causes updates from timestamp 46 onward to be returned, and the upper bound causes updates at timestamp 1410 and earlier to be returned, causing all updates from write buffer 206C and some updates from write buffer 206D to be returned.

By returning this merged collection of records, the KV store engine ensures that updates yet to be committed to storage will be reflected in response to the query of the persistent storage transaction, causing a read (whether the persistent storage transaction is read-only or read-write) which is consistent as of the snapshot read timestamp.

At a step 810, the KV store engine records a smallest snapshot read commit timestamp.

The smallest snapshot read commit timestamp is based on the smallest snapshot read global timestamp, as described above with reference to FIGS. 7A and 7B. This timestamp which may prevent the garbage collection process from advancing past garbage collection operations having the same or larger timestamps, and may cause write buffers and page mapping table entries having older timestamps to be marked for removal, while preventing newer write buffers and page mapping table entries from being removed. For example, according to FIG. 2A, in the event that the smallest snapshot read commit timestamp is 43, only write buffers up to and including 206A may be removed.

Figure 9A:
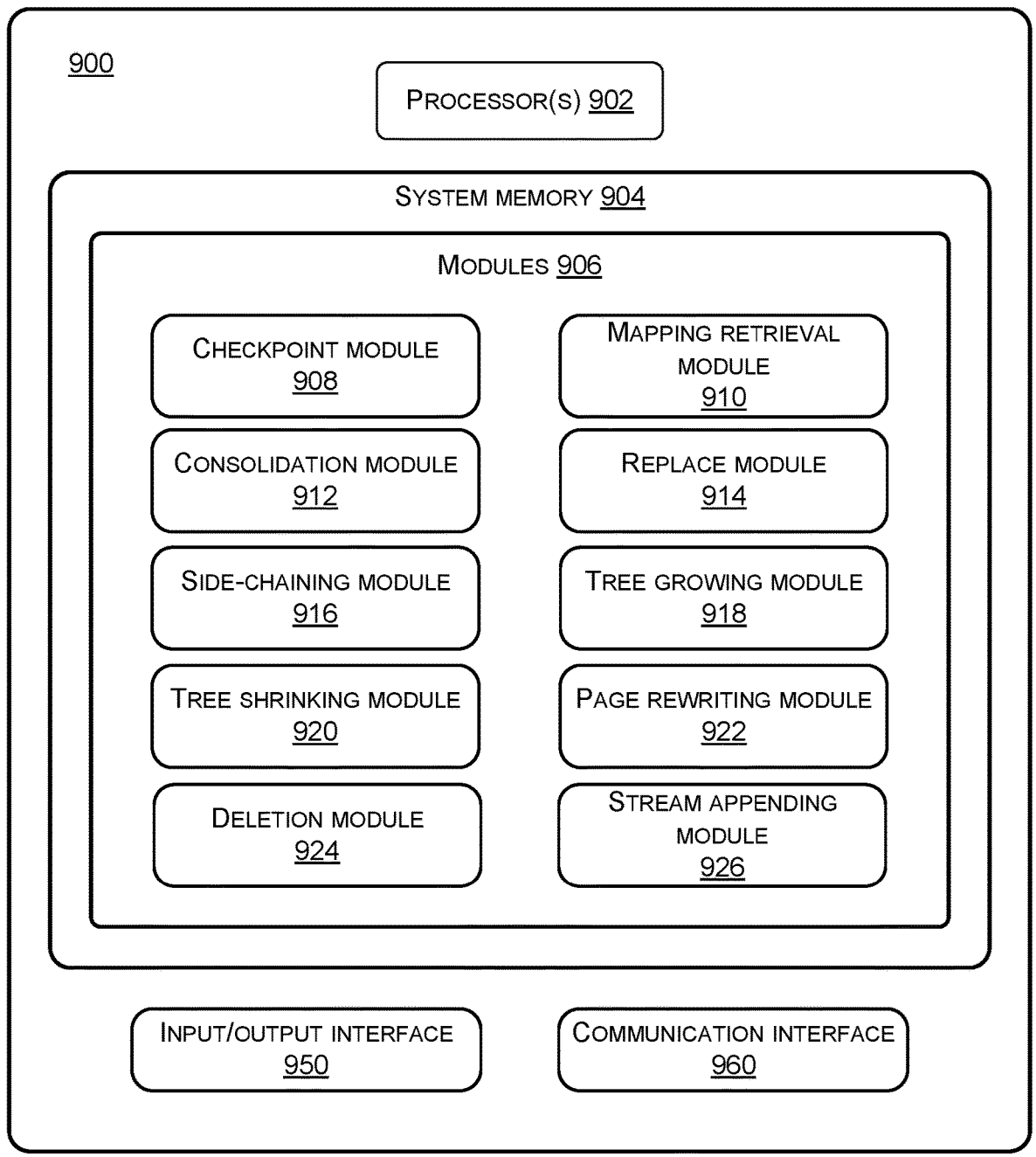
FIGS. 9A and 9B illustrate an example storage system for implementing the processes and methods described herein making up a KV store engine.
Figure 9B:
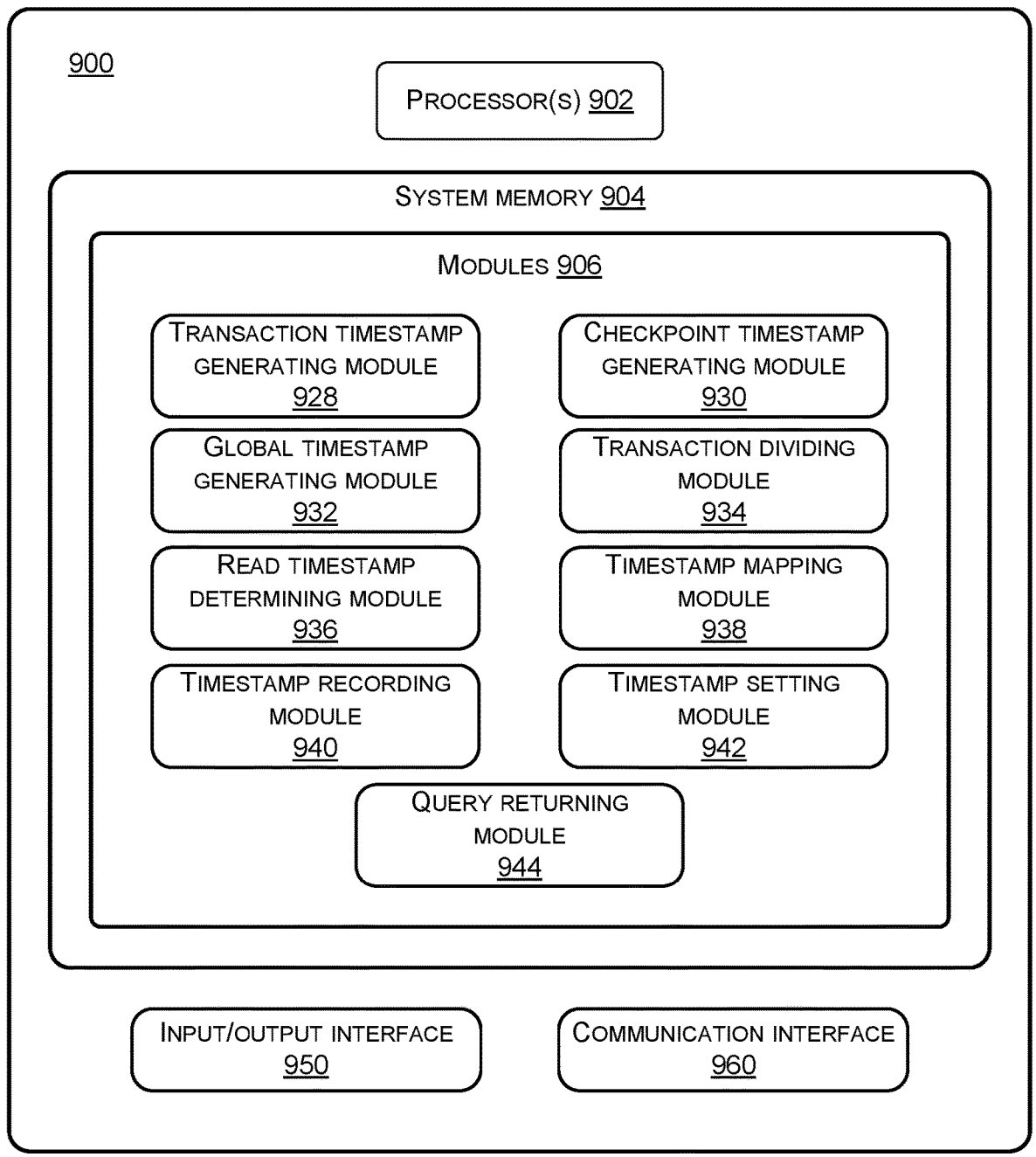

FIGS. 9A and 9B illustrate an example storage system 900 for implementing the processes and methods described above making up a KV store engine.

The techniques and mechanisms described herein may be implemented by multiple instances of the system 900, as well as by any other computing device, system, and/or environment. The system 900 may be one or more computing systems of a cloud computing system providing physical or virtual computing and storage resources as known by persons skilled in the art. The system 900 shown in FIGS. 9A and 9B is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 900 may include one or more processors 902 and system memory 904 communicatively coupled to the processor(s) 902. The processor(s) 902 and system memory 904 may be physical or may be virtualized and/or distributed. The processor(s) 902 may execute one or more modules and/or processes to cause the processor(s) 902 to perform a variety of functions. In embodiments, the processor(s) 902 may include a central processing unit ("CPU"), a graphics processing unit ("GPU"), both CPU and GPU, or other processing units or components known in the art. Additionally, each of the processor(s) 902 may possess its own local memory, which also may store program modules, program data, and/or one or more operating systems.

Depending on the exact configuration and type of the system 900, the system memory 904 may be volatile, such as RAM, non-volatile, such as ROM, flash memory, miniature hard drive, memory card, and the like, or some combination thereof. The system memory 904 may include one or more computer-executable modules 906 that are executable by the processor(s) 902.

The modules 906 may include, but are not limited to, a checkpoint module 908, a mapping retrieval module 910, a consolidation module 912, a replace module 914, a side-chaining module 916, a tree growing module 918, a tree shrinking module 920, a page rewriting module 922, a deletion module 924, a stream appending module 926, a transaction timestamp generating module 928, a checkpoint timestamp generating module 930, a global timestamp generating module 932, a transaction dividing module 934, a read timestamp determining module 936, a timestamp mapping module 938, a timestamp recording module 940, a timestamp setting module 942, and a query returning module 944.

The checkpoint module 908 may be configured to perform a checkpoint operation as described above with reference to FIGS. 2A through 3C.

The mapping retrieval module 910 may be configured to perform a mapping retrieval operation as described above with reference to FIG. 2A.

The consolidation module 912 may be configured to perform a consolidation operation as described above with reference to FIGS. 5A through 5C.

The replace module 914 may be configured to perform a replace operation as described above with reference to FIG. 5A through 5C.

The side-chaining module 916 may be configured to perform a side-chaining operation as described above with reference to FIGS. 5A through 5C.

The tree growing module 918 may be configured to perform a tree growing operation as described above.

The tree shrinking module 920 may be configured to perform a tree shrinking operation as described above with reference to FIGS. 6A through 6C.

The page rewriting module 922 may be configured to perform a page rewriting operation as described above with reference to FIGS. 6A through 6C.

The deletion module 924 may be configured to perform a deletion operation as described above.

The stream appending module 926 may be configured to insert updates into a first page stream and a second page stream as described above with reference to FIGS. 3A through 3D.

The transaction timestamp generating module 928 may be configured to generate transaction commit timestamps and snapshot read timestamps as described above with reference to FIGS. 3A through 3D.

The checkpoint timestamp generating module 930 may be configured to generate system timestamps and snapshot read system timestamps as described above with reference to FIGS. 3A through 3D, and FIGS. 7A through 8.

The global timestamp generating module 932 may be configured to generate a global timestamp as described above with reference to FIGS. 7A and 7B.

The transaction dividing module 934 may be configured to determine that a query targets records stored across multiple partitions of the storage system and divide the persistent storage transaction into multiple sub-transactions, as described above with reference to FIGS. 7A and 7B.

The read timestamp determining module 936 may be configured to determine a snapshot read timestamp of a sub-transaction at a partition based on a largest committed global timestamp at the partition, as described above with reference to FIGS. 7A and 7B.

The timestamp mapping module 938 may be configured to map the global timestamp to a largest local transaction commit timestamp at the partition as described above with reference to FIGS. 7A and 7B.

The timestamp recording module 940 may be configured to record a largest global timestamp among sub-transactions committed at a partition, record a smallest snapshot read global timestamp across all partitions, record a largest committed system timestamp, record a smallest non-committed transaction commit timestamp, and record a smallest snapshot read commit timestamp as described above with reference to FIGS. 7A through 8.

The timestamp setting module 942 may be configured to set a snapshot read system timestamp of a mapping update operation to the largest committed transaction commit timestamp, and set a snapshot read timestamp of a persistent storage transaction based on the largest committed system timestamp and the smallest non-committed transaction commit timestamp, as described above with reference to FIG. 8.

The query returning module 944 may be configured to return a merged collection of records based on an upper bound and a lower bound based on the snapshot read timestamp as described above with reference to FIG. 8.

The storage system 900 may additionally include an input/output (I/O) interface 950 and a communication module 960 allowing the storage system 900 to communicate with other systems and devices over a network, such as a cloud network as described above with reference to FIG. 1. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-8. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, systems and methods discussed herein provide implementing snapshot isolation, and more specifically, based on a key-value data store including multiple-tiered sorted data structures in memory and storage, implementing granularly timestamped concurrency control. Since such a key-value data store supports concurrent file and/or data operations, snapshot isolation further ensures that records of the data store are consistent between different operations, and snapshot isolation may be implemented by multi-version concurrency control ("MVCC"), wherein the data store is configured to store multiple snapshot versions of stored objects upon each write operation. The multiple-tiering of the key-value data store enables resolving the snapshot queries by returning data record(s) according to granularly timestamped snapshot lookup instead of singularly indexed snapshot lookup. Queries return a merged collection of records including updates from data structures in memory and in storage, such that a persistent storage transaction may refer to non-committed updates up to a timeframe defined by the snapshot read timestamp. This way, inconsistency is avoided that would result from merely reading data records committed in storage, without regard as to pending, non-committed updates thereto. The global timestamp further modifies the generation of the local transaction commit timestamp and the local snapshot read timestamp, so as to establish a granularly timestamped concurrency control scheme (over three levels of granularity).

EXAMPLE CLAUSES

A. A method comprising: recording, by a key-value ("KV") store engine running on a storage system, a largest committed system timestamp and a smallest non-committed transaction commit timestamp; setting, by the KV store engine, a snapshot read timestamp of a persistent storage transaction based on the largest committed system timestamp and the smallest non-committed transaction commit timestamp; and returning, by the KV store engine, a merged collection of records based on an upper bound and a lower bound derived from the snapshot read timestamp.

B. The method as paragraph A recites, wherein the snapshot read timestamp comprises the largest committed system timestamp, and comprises the smallest non-committed transaction commit timestamp less 1.

C. The method as paragraph A recites, further comprising dividing, by the KV store engine, a persistent storage transaction into a plurality of sub-transactions.

D. The method as paragraph A recites, further comprising generating, by the KV store engine, a local transaction commit timestamp of a sub-transaction of the plurality of sub-transactions at a partition of the storage system; and mapping, by the KV store engine, a global timestamp of the sub-transaction to a largest local transaction commit timestamp at the partition.

E. The method as paragraph D recites, further comprising recording, by the KV store, a largest global timestamp among sub-transactions committed at the partition, and recording, by the KV store, a smallest snapshot read global timestamp across all partitions.

F. The method as paragraph D recites, further comprising determining, by the KV store engine, a snapshot read timestamp of the sub-transaction at the partition based on a largest committed global timestamp at the partition.

G. The method as paragraph F recites, wherein determining, by the KV store engine, the snapshot read timestamp comprises, in the event that the smallest mapped global timestamp is larger than the largest committed global timestamp is equal to the largest committed global timestamp, setting the snapshot read timestamp of the sub-transaction to the largest local transaction commit timestamp; and in the event that the smallest mapped global timestamp is larger than the largest committed global timestamp, setting the snapshot read timestamp of the sub-transaction to the largest local transaction commit timestamp less 1.

H. A storage system comprising: one or more processors; hosted storage; and memory communicatively coupled to the one or more processors, the memory storing computer-executable modules executable by the one or more processors that, when executed by the one or more processors, perform associated operations, the computer-executable modules comprising: a timestamp recording module configured to record, by a key-value ("KV") store engine running on a storage system, a largest committed system timestamp and a smallest non-committed transaction commit timestamp; a timestamp setting module, configured to set a snapshot read timestamp of a persistent storage transaction based on the largest committed system timestamp and the smallest non-committed transaction commit timestamp; and a query returning module, configured to return a merged collection of records based on an upper bound and a lower bound derived from the snapshot read timestamp.

I. The system as paragraph H recites, wherein the snapshot read timestamp comprises the largest committed system timestamp, and comprises the smallest non-committed transaction commit timestamp less 1.

J. The system as paragraph H recites, further comprising a transaction dividing module configured to divide a persistent storage transaction into a plurality of sub-transactions.

K. The system as paragraph H recites, further comprising a transaction timestamp generating module configured to generate a local transaction commit timestamp of a sub-transaction of the plurality of sub-transactions at a partition of the storage system; and a timestamp mapping module configured to map a global timestamp of the sub-transaction to a largest local transaction commit timestamp at the partition.

L. The system as paragraph K recites, wherein the timestamp recording module is further configured to record a largest global timestamp among sub-transactions committed at the partition, and record a smallest snapshot read global timestamp across all partitions.

M. The system as paragraph K recites, further comprising a read timestamp determining module configured to determine a snapshot read timestamp of the sub-transaction at the partition based on a largest committed global timestamp at the partition.

N. The system as paragraph M recites, wherein the read timestamp determining module is configured to determine the snapshot read timestamp by, in the event that the smallest mapped global timestamp is larger than the largest committed global timestamp is equal to the largest committed global timestamp, setting the snapshot read timestamp of the sub-transaction to the largest local transaction commit timestamp; and in the event that the smallest mapped global timestamp is larger than the largest committed global timestamp, setting the snapshot read timestamp of the sub-transaction to the largest local transaction commit timestamp less 1.

O. A computer-readable storage medium storing computer-readable instructions executable by one or more processors, that when executed by the one or more processors, cause the one or more processors to perform operations comprising: recording, by a key-value ("KV") store engine running on a storage system, a largest committed system timestamp and a smallest non-committed transaction commit timestamp; setting, by the KV store engine, a snapshot read timestamp of a persistent storage transaction based on the largest committed system timestamp and the smallest non-committed transaction commit timestamp; and returning, by the KV store engine, a merged collection of records based on an upper bound and a lower bound derived from the snapshot read timestamp.

P. The computer-readable storage medium as paragraph O recites, wherein the snapshot read timestamp comprises the largest committed system timestamp, and comprises the smallest non-committed transaction commit timestamp less 1.

Q. The computer-readable storage medium as paragraph O recites, wherein the operations further comprise dividing, by the KV store engine, a persistent storage transaction into a plurality of sub-transactions.

R. The computer-readable storage medium as paragraph O recites, wherein the operations further comprise generating, by the KV store engine, a local transaction commit timestamp of a sub-transaction of the plurality of sub-transactions at a partition of the storage system; and mapping, by the KV store engine, a global timestamp of the sub-transaction to a largest local transaction commit timestamp at the partition.

S. The computer-readable storage medium as paragraph R recites, wherein the operations further comprise recording, by the KV store, a largest global timestamp among sub-transactions committed at the partition, and recording, by the KV store, a smallest snapshot read global timestamp across all partitions.

T. The computer-readable storage medium as paragraph R recites, wherein the operations further comprise determining, by the KV store engine, a snapshot read timestamp of the sub-transaction at the partition based on a largest committed global timestamp at the partition.

U. The computer-readable storage medium as paragraph T recites, wherein determining, by the KV store engine, the snapshot read timestamp comprises, in the event that the smallest mapped global timestamp is larger than the largest committed global timestamp is equal to the largest committed global timestamp, setting the snapshot read timestamp of the sub-transaction to the largest local transaction commit timestamp; and in the event that the smallest mapped global timestamp is larger than the largest committed global timestamp, setting the snapshot read timestamp of the sub-transaction to the largest local transaction commit timestamp less 1.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    recording, by a key-value ("KV") store engine running on a storage system, a largest committed system timestamp and a smallest non-committed transaction commit timestamp;
    setting, by the KV store engine, a snapshot read timestamp of a persistent storage transaction based on the largest committed system timestamp and the smallest non-committed transaction commit timestamp;
    returning, by the KV store engine, a merged collection of records based on an upper bound and a lower bound derived from the snapshot read timestamp;
    mapping, by the KV store engine, a global timestamp of the sub-transaction to a largest local transaction commit timestamp of a sub-transaction of the plurality of sub-transactions at a partition of the storage system;
    setting, by the KV store engine, in the event that the smallest mapped global timestamp is larger than a largest committed global timestamp at the partition or is equal to the largest committed global timestamp, a snapshot read timestamp of the sub-transaction at the partition to a largest local transaction commit timestamp; and
    setting, by the KV store engine, in the event that the smallest mapped global timestamp is larger than the largest committed global timestamp, the snapshot read timestamp of the sub-transaction to the largest local transaction commit timestamp less 1.

2. The method of claim 1, wherein the snapshot read timestamp comprises the largest committed system timestamp, and comprises the smallest non-committed transaction commit timestamp less 1.

3. The method of claim 1, further comprising dividing, by the KV store engine, a persistent storage transaction into a plurality of sub-transactions.

4. The method of claim 1, further comprising recording, by the KV store, a largest global timestamp among sub-transactions committed at the partition, and recording, by the KV store, a smallest snapshot read global timestamp across all partitions.

5. A storage system comprising:
    one or more processors;
    hosted storage; and
    memory communicatively coupled to the one or more processors, the memory storing computer-executable modules executable by the one or more processors that, when executed by the one or more processors, perform associated operations, the computer-executable modules comprising:

a timestamp recording module configured to record, by a key-value ("KV") store engine running on a storage system, a largest committed system timestamp and a smallest non-committed transaction commit timestamp;

a timestamp setting module, configured to set a snapshot read timestamp of a persistent storage transaction based on the largest committed system timestamp and the smallest non-committed transaction commit timestamp;

a query returning module, configured to return a merged collection of records based on an upper bound and a lower bound derived from the snapshot read timestamp;

a timestamp mapping module, configured to map a global timestamp of the sub-transaction to a largest local transaction commit timestamp of a sub-transaction of the plurality of sub-transactions at a partition of the storage system;

a read timestamp determining module, configured to set, in the event that the smallest mapped global timestamp is larger than a largest committed global timestamp at the partition or is equal to the largest committed global timestamp, a snapshot read timestamp of the sub-transaction at the partition to a largest local transaction commit timestamp; and to set, in the event that the smallest mapped global timestamp is larger than the largest committed global timestamp, the snapshot read timestamp of the sub-transaction to the largest local transaction commit timestamp less 1.

6. The system of claim 5, wherein the snapshot read timestamp comprises the largest committed system timestamp, and comprises the smallest non-committed transaction commit timestamp less 1.

7. The system of claim 5, further comprising a transaction dividing module configured to divide a persistent storage transaction into a plurality of sub-transactions.

8. The system of claim 5, wherein the timestamp recording module is further configured to record a largest global timestamp among sub-transactions committed at the partition, and record a smallest snapshot read global timestamp across all partitions.

9. A computer-readable storage medium storing computer-readable instructions executable by one or more processors, that when executed by the one or more processors, cause the one or more processors to perform operations comprising:

recording, by a key-value ("KV") store engine running on a storage system, a largest committed system timestamp and a smallest non-committed transaction commit timestamp;

setting, by the KV store engine, a snapshot read timestamp of a persistent storage transaction based on the largest committed system timestamp and the smallest non-committed transaction commit timestamp;

returning, by the KV store engine, a merged collection of records based on an upper bound and a lower bound derived from the snapshot read timestamp;

mapping, by the KV store engine, a global timestamp of the sub-transaction to a largest local transaction commit timestamp of a sub-transaction of the plurality of sub-transactions at a partition of the storage system;

setting, by the KV store engine, in the event that the smallest mapped global timestamp is larger than a largest committed global timestamp at the partition or is equal to the largest committed global timestamp, a snapshot read timestamp of the sub-transaction at the partition to a largest local transaction commit timestamp; and setting, by the KV store engine, in the event that the smallest mapped global timestamp is larger than the largest committed global timestamp, the snapshot read timestamp of the sub-transaction to the largest local transaction commit timestamp less 1.

10. The computer-readable storage medium of claim 9, wherein the snapshot read timestamp comprises the largest committed system timestamp, and comprises the smallest non-committed transaction commit timestamp less 1.

11. The computer-readable storage medium of claim 9, wherein the operations further comprise dividing, by the KV store engine, a persistent storage transaction into a plurality of sub-transactions.

12. The computer-readable storage medium of claim 4, wherein the operations further comprise recording, by the KV store, a largest global timestamp among sub-transactions committed at the partition, and recording, by the KV store, a smallest snapshot read global timestamp across all partitions.

* * * * *